United States Patent
Lee et al.

(10) Patent No.: US 9,049,165 B2
(45) Date of Patent: Jun. 2, 2015

(54) METHOD FOR DELIVERING MESSAGE BASED ON CPM SERVICE AND SERVER THEREOF

(75) Inventors: Hyeon-Soo Lee, Gyeonggi-Do (KR); Christophe Le Thierry D'Ennequin, Paris (FR); Dong-Young Lee, Gyeonggi-Do (KR); Kang-Suk Huh, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 388 days.

(21) Appl. No.: 12/689,850

(22) Filed: Jan. 19, 2010

(65) Prior Publication Data

US 2010/0185740 A1    Jul. 22, 2010

Related U.S. Application Data

(60) Provisional application No. 61/145,731, filed on Jan. 19, 2009, provisional application No. 61/242,339, filed on Sep. 14, 2009, provisional application No. 61/244,009, filed on Sep. 18, 2009, provisional (Continued)

(30) Foreign Application Priority Data

Jan. 13, 2010  (KR) ................... 10-2010-0002950

(51) Int. Cl.
*H04L 12/58*  (2006.01)
*H04L 29/08*  (2006.01)

(52) U.S. Cl.
CPC ............... *H04L 51/36* (2013.01); *H04L 12/587* (2013.01); *H04L 12/5895* (2013.01); *H04L 51/24* (2013.01); *H04L 51/14* (2013.01); *H04L 67/306* (2013.01); *H04L 67/327* (2013.01)

(58) Field of Classification Search
None
See application file for complete search history.

(56) References Cited

U.S. PATENT DOCUMENTS

| 6,643,687 | B1 * | 11/2003 | Dickie et al. | 709/206 |
| 2002/0126631 | A1 * | 9/2002 | Lee | 370/328 |
| 2002/0174108 | A1 * | 11/2002 | Cotner et al. | 707/3 |

(Continued)

FOREIGN PATENT DOCUMENTS

| CN | 101103596 A | 1/2008 |
| CN | 101227418 A | 7/2008 |

(Continued)

OTHER PUBLICATIONS

Christophe, "3GPP Multimedia Telephony & OMA CPM", Feb. 20, 2008, http://theimslantern.blogspot.com.*

*Primary Examiner* — Ario Etienne
*Assistant Examiner* — Ho Shiu
(74) *Attorney, Agent, or Firm* — Birch, Stewart, Kolasch & Birch, LLP

(57) ABSTRACT

A method for delivering a message from a converged IP messaging (CPM) server include: checking registered target terminals that can receive a message from a source terminal based on a user preference; determining whether to deliver a message from the source terminal to the checked target terminal based on the user preference; when the message is determined to be delivered, determining whether to store the message in a message storage server based on the user preference; when the message is determined to be stored, requesting the message storage server to store the message; receiving a response message including information regarding the stored message from the message storage server; and including the information in the message and transmitting the same to the target terminal.

13 Claims, 15 Drawing Sheets

Related U.S. Application Data application No. 61/252,149, filed on Oct. 15, 2009, provisional application No. 61/253,488, filed on Oct. 20, 2009, provisional application No. 61/253,827, filed on Oct. 21, 2009, provisional application No. 61/264,251, filed on Nov. 25, 2009.

(56) References Cited

U.S. PATENT DOCUMENTS

| | | | |
|---|---|---|---|
| 2003/0093576 A1* | 5/2003 | Dettinger et al. | 709/313 |
| 2004/0120319 A1* | 6/2004 | Asawa et al. | 370/395.4 |
| 2004/0122900 A1* | 6/2004 | Pous et al. | 709/206 |
| 2004/0153483 A1* | 8/2004 | Cox | 707/206 |
| 2004/0172429 A1* | 9/2004 | Goguen | 707/206 |
| 2005/0204012 A1* | 9/2005 | Campbell | 709/206 |
| 2006/0123087 A1* | 6/2006 | Gibson | 709/206 |
| 2006/0153242 A1* | 7/2006 | Krause et al. | 370/493 |
| 2006/0161626 A1* | 7/2006 | Cardina et al. | 709/206 |
| 2006/0168031 A1* | 7/2006 | Cai et al. | 709/206 |
| 2006/0176878 A1* | 8/2006 | Han | 370/389 |
| 2006/0224526 A1* | 10/2006 | Klug | 705/410 |
| 2006/0242245 A1* | 10/2006 | Christensen | 709/206 |
| 2006/0259560 A1* | 11/2006 | Han et al. | 709/206 |
| 2007/0178919 A1* | 8/2007 | Huggett et al. | 455/466 |
| 2007/0180082 A1* | 8/2007 | Abraham et al. | 709/223 |
| 2007/0186271 A1* | 8/2007 | Ryu et al. | 725/135 |
| 2007/0192425 A1* | 8/2007 | Pous et al. | 709/206 |
| 2007/0192743 A1* | 8/2007 | Lee | 715/828 |
| 2007/0275697 A1* | 11/2007 | Aminzadeh | 455/414.1 |
| 2007/0291795 A1* | 12/2007 | Munje | 370/498 |
| 2008/0113679 A1* | 5/2008 | Sung et al. | 455/466 |
| 2008/0114881 A1* | 5/2008 | Lee et al. | 709/227 |
| 2008/0123686 A1* | 5/2008 | Lee et al. | 370/466 |
| 2008/0139176 A1* | 6/2008 | Kim | 455/412.1 |
| 2008/0140784 A1* | 6/2008 | O'Sullivan et al. | 709/206 |
| 2008/0170563 A1* | 7/2008 | Zhu et al. | 370/352 |
| 2008/0182556 A1* | 7/2008 | Kozam | 455/411 |
| 2008/0186853 A1* | 8/2008 | Archer et al. | 370/235 |
| 2008/0198871 A1* | 8/2008 | Shahidi et al. | 370/465 |
| 2008/0235402 A1* | 9/2008 | Azam et al. | 709/248 |
| 2008/0239951 A1* | 10/2008 | Strom | 370/230 |
| 2008/0256117 A1* | 10/2008 | Laurila et al. | 707/102 |
| 2008/0281971 A1* | 11/2008 | Leppanen et al. | 709/228 |
| 2008/0304637 A1* | 12/2008 | Ganganna | 379/88.23 |
| 2009/0052455 A1* | 2/2009 | Kim | 370/392 |
| 2009/0067408 A1* | 3/2009 | Leppainen et al. | 370/350 |
| 2009/0080404 A1* | 3/2009 | Laurila et al. | 370/348 |
| 2009/0106455 A1* | 4/2009 | Xu et al. | 709/248 |
| 2009/0213841 A1* | 8/2009 | Masson | 370/352 |
| 2009/0222457 A1* | 9/2009 | Gallant | 707/10 |
| 2009/0286516 A1* | 11/2009 | Sedlacek et al. | 455/414.1 |
| 2009/0287784 A1* | 11/2009 | Haruna | 709/206 |
| 2009/0293123 A1* | 11/2009 | Jackson et al. | 726/23 |
| 2010/0017598 A1* | 1/2010 | Rodriguez et al. | 713/156 |
| 2010/0177736 A1* | 7/2010 | Wang et al. | 370/331 |
| 2010/0318624 A1* | 12/2010 | Pattan et al. | 709/207 |
| 2010/0325192 A1 | 12/2010 | Lee et al. | |
| 2011/0164616 A1* | 7/2011 | Kloth et al. | 370/392 |
| 2011/0208830 A1* | 8/2011 | Haruna et al. | 709/217 |

FOREIGN PATENT DOCUMENTS

| | | |
|---|---|---|
| CN | 101227456 A | 7/2008 |
| KR | 10-2008-0043103 A | 5/2008 |
| KR | 10-2008-0043134 A | 5/2008 |
| KR | 10-2008-0043264 A | 5/2008 |
| KR | 10-2008-0048366 A | 6/2008 |
| KR | 10-2009-0087781 A | 8/2009 |
| WO | WO 2009/002066 A | 12/2008 |

* cited by examiner

METHOD FOR DELIVERING MESSAGE BASED ON CPM SERVICE AND SERVER THEREOF

CROSS-REFERENCE TO RELATED APPLICATION

The present application is related to and claims the benefit of U.S. Provisional Applications No. 61/145,731 filed on Jan. 19, 2009, No. 61/242,339 filed on Sep. 14, 2009, No. 61/244,009 filed on Sep. 18, 2009, No. 61/252,149 filed on Oct. 15, 2009, No. 61/253,488 filed on Oct. 20, 2009, No. 61/253,827 filed on Oct. 21, 2009, and No. 61/264,251 filed on Nov. 25, 2009 and the benefit of earlier filing date and right of priority to Korean Applications No. 10-2010-0002950 filed on Jan. 13, 2010, the entire contents of which being incorporated herein by reference.

BACKGROUND OF THE INVENTION

1. Field of the Invention

The present invention relates to a converged IP messaging (CPM) service.

2. Description of the Related Art

These days, various services, for example, an SMS, an MMS, an e-mail service, and the like, allow for transmission and reception of messages via mobile devices.

Recently, there have been attempts to integrate those services, which are separately provided to transmit and receive messages, and a CPM service is one of these attempts.

The CPM service is a service in which the user can send and receive a CPM message in the environments of an IP multimedia subsystem. The CPM supports the environments of a pager mode message and a session mode message. Furthermore, the CPM service supports not only discrete media but also continuous media.

FIG. 1 is a block diagram illustrating the configuration of a network and a terminal for CPM services.

Referring to FIG. 1, there are illustrated a terminal 10, a SIP/IP network 50, a message storage server 60, an interworking server 70, and a CPM server 80.

First, the terminal 10 may include a message storage client 11 and a CPM client 12. The message storage client 11 stores transmitted and received messages, and synchronizes the stored messages with the message storage server 60.

The SIP/IP network 50 may be a network on the basis of IMS.

The message storage server 60 receives a message from the CPM server 80, and serves to store transmitted and received messages and a conversation history with the media based on the user preference. Furthermore, the message storage server 60 may share data through synchronization with the terminal 10. In other words, the message storage server 60 receives and stores a message stored in the terminal 10, and transmits the message stored in the message storage server 60 to the terminal 10.

The message storage server 60 uses IMAO protocol for the synchronization. Accordingly, the message storage server 60 serves as an IMAP server, and the terminal 10 is operated as an IMAP client.

The interworking server 70 may include an interworking function unit 71 and an interworking selection function unit 72. The interworking function unit 71 serves to convert a CPM message into SMS, MMS, and the like, or convert SMS, MMS, and the like, into a CPM message. The interworking selection function unit 72 serves to determine whether or not the conversion is to be performed.

The CPM server 80 may include a CPM participating function (PF) server 81 and a CPM controlling function (CF) server 82. The CPM PF server 81 transmits a message to the message storage server 60. Also, the CPM PF server 81 transmits and/or receives messages to and/or from the CPM client 12 of the terminal 10.

FIG. 2 is an exemplary view illustrating a process of transmitting and/or receiving CPM messages.

Referring to FIG. 2, there are illustrated a terminal A1 10A of a user A, terminals B1 and B2 10B of a user B, a home network of the user A, a home network of the user B, and a message storage server 60. The home network of the user A may include a SIP/IP network 50A and a CPM PF server 81A. The home network of the user B may include a SIP/IP network 50B and a CPM PF server 81B.

First, according to a request of the user A, the terminal A1 10A transmits a message to the CPM PF server 81A through the SIP/IP network 50A (S01, S02). The CPM PF server 81A transmits the message to the CPM PF server 81B through the SIP/IP network 50A within a home network of the user A and the SIP/IP network 50B in a home network of the user B (S03, S04, S05).

When receiving the message, the CPM PF server 81B transmits it to a terminal B1 10B of the user B though the SIP/IP network 50B (S06, S07).

Also, when receiving the message, the CPM PF server 81B transmits it to a terminal B2 10B of the user B though the SIP/IP network 50B (S08, S09).

The terminals B1 10B and B2 10B of the user B transmit OK messages respectively to the CPM PF server 81B through the SIP/IP network 50B within a home network of the user B (S10, S11).

When receiving the OK message, the CPM PF server 81B transmits it to the CPM PF server 81A of the user A through the SIP/IP network 50B within the home network of the user B and the SIP/IP network 50A within the home network of the user A (S12 to S15).

When receiving the OK message, the CPM PF server 81A within the home network of the user A delivers the OK message to the terminal A1 10A that has transmitted the message (S16).

In the above, there has been described a process of delivering a message. Hereinafter, an example will be illustrated in which the transmitted and received message is stored in the message storage server 60.

FIG. 3 is a flow chart illustrating an operation of a message storage server of FIG. 1 and a message synchronization process.

The processes S21-S25 illustrated in FIG. 3 are similar to the processes S01-S05 illustrated in FIG. 2, and thus the content of FIG. 1 will be used for the description.

When the CPM PF server 81B receives a CPM message from the terminal A1, the CPM PF server 81B determines whether to store it in the message storage server 60 and deliver it based on subscriber information of the user B (S26).

When the CPM message is determined to be stored and delivered, the CPM PF server 81B transmits the CPM message to the message storage server 60 (S27).

The message storage server 60 stores the received CPM message (S28), and transmits an OK message to the CPM PF server 81B (S29). In this case, it is assumed that first and second messages have been stored in the message storage server 60 and have been previously synchronized with the terminal B1 10B. An identification indicating that the received CPM message has not been synchronized with the terminal B1 10B is stored in the message storage server 60.

The CPM PF server 81B transmits the CPM message to the terminal B1 10B via the SIP/IP network 50B (S30).

Upon receiving the CPM message, the terminal B1 stores the CPM message in the message storage client (S31). In this case, it is assumed that first and second messages have been stored in the terminal B1 10B and have been previously synchronized with the message storage server 60. An identification indicating that the received CPM message has not been synchronized with the message storage server 60 is stored in terminal B1 10B.

The terminal B1 10B transmits an OK message to the CPM PF server 81B via the SIP/IP network 81B within the home network of the user B (S32).

When the CPM PF server 81B receives the OK message, it transmits the received OK message to the CPM PF server 81A of the user A via the SIP/IP network 50B within the home network of the user B and the SIP/IP network 50A within the home network of the user A (S33 to S35).

When the CPM PF server 81A within the home network of the user A receives the OK message, it delivers the OK message to the terminal A1 10A which had transmitted the CPM message (S36).

Meanwhile, in order to be synchronized with the message storage server 60, the terminal B1 (10B) transmits a synchronization request message to the message storage server 60 (S37).

Then, the message storage server 60 checks whether or not there is a message which has not been synchronized with the terminal B1 10B. If it is checked that the newly stored CPM message has not been synchronized by the identification, the message storage server 60 notifies the terminal B1 10B about the presence of the new message (S38).

Upon checking the presence of the non-received message based on the notification, the terminal B1 10B requests the non-received message from the message storage server 60 (S40).

The message storage server 60 transmits the CPM message to the terminal B1 10B (S41). However, the CPM message has been already received by the terminal B1 10B in step S30, resulting in that the terminal B1 10B repeatedly receives the same CPM message again.

Meanwhile, if it is checked by the identification that the stored message is not synchronized yet in step S31, the terminal B1 10B determines that there is a non-transmitted message (S42), and transmits the CPM message to the message storage server 60 (S43).

In this case, however, the CPM message has been already received by the message storage server 60 in step S27, resulting in that the message storage server 60 repeatedly receives the same CPM message again.

As described above, the message storage server 60 provides the function of storing the transmitted or received message and message synchronization function, but it has a technical problem in that the same message is repeatedly delivered and stored.

Also, because the same message is repeatedly transmitted and received, the network resource is wasted. In general, it is known that a single user usually sends or receives 10 or some messages in average a day. Thus, if one hundred users are within the network, the waste of the network resources due to the repeatedly transmitted and received messages would become severe.

In addition, generally, the terminal 10 is a portable device with a limited memory size, so the repeated storing of the messages would cause a waste of the memory. In particular, it is known that a single user usually sends or receives 10 or some messages in average a day. Thus, the repeated storing of the messages would end in storing of multiple unnecessary messages, accelerating the shortage of storage space, and making the user to frequently erase the messages.

SUMMARY OF THE INVENTION

Therefore, in order to address the above matters, the various features described herein have been conceived.

An object of the present invention is to effectively use network resources by not repeatedly transmitting, receiving or storing messages.

Another object of the present invention is to effectively use a memory of a terminal by not repeatedly storing messages.

To achieve the above objects, there is provided a converged IP messaging (CPM) server. The server includes: a processor configured to check whether there are registered target terminals that can receive a message from a source terminal based on a user preference (or user settings), determine whether to deliver a message from the source terminal to the checked target terminals based on the user preference, and determine whether to store the message in a message storage server if the message is determined to be delivered; and a transceiver configured to request the message storage server to store the message if the message is determined to be stored, receive a response message including information regarding the stored message, and transmit the message including the information to the target terminals.

To achieve the objects, there is also provided a method for delivering a message from a converged IP messaging (CPM) server.

The message delivery method may include: checking whether there are registered target terminals that can receive a message from a source terminal based on a user preference; determining whether to deliver a message from the source terminal to the checked target terminal based on the user preference; determining whether to store the message in a message storage server based on the user preference if the message is determined to be delivered or interworked; requesting the message storage server to store the message if the message is determined to be stored; receiving a response message including information regarding the stored message from the message storage server; and transmitting the message including the information to the target terminal.

The message delivery method may further include: determining whether to defer the message, whether to interwork the message, whether to redirect the message to a different terminal, or whether to store the message in the message storage server, according to the user preference.

The message delivery method may further include: performing deferring or interworking the message according to an operator policy if the message delivery to the target terminal fails for some reason although the user preference indicates message delivery to the target terminal.

The message delivery method may further include determining whether to reject the message based on the information in the message from the source terminal.

The information may allow for discrimination of the message in the message storage server. The information may be a unique identification (or unique identifier) (UID) with respect to the message.

The CPM server may be located within a home network of the target terminal.

The message delivery method may further include: checking whether or not the message from the source terminal is in a CPM large mode; and if the message is in the CPM large mode, waiting until when receiving of the current message from the source terminal is completed.

The message delivery method may further include: receiving response messages from the target terminal; and transmitting the response messages from the target terminal to the CPM server located in the home network of the source terminal.

When there are a plurality of target terminals and a first response message, among the response messages from the plurality of target terminals, is received in the response message transmission step, the first response message may be transmitted to the CPM server located in the home network of the source terminal.

To achieve the above objects, there is also provided a method for delivering a message from a CPM server. The message delivery method may include: checking whether there are registered target terminals that can receive a message from a source terminal based on a user preference; determining whether to deliver the message from the source terminal to the checked target terminal in an interworking manner or to redirect the message to a different terminal based on the user preference; determining whether to store the message in a message storage server based on the user preference if the message is determined to be interworked or redirected; requesting the message storage server to store the message if the message is determined to be stored; receiving a response message including information regarding the stored message from the message storage server; and transmitting the message including the information to the target terminal in an interworking manner or redirecting the same to the different terminal.

According to the exemplary embodiments of the present invention, messages are not repeated during the synchronization process between the terminal supporting the CPM service and the message storage server. Thus, because messages are not repeatedly transmitted, received, nor stored, the network resources can be effectively used. Also, because the messages are not repeatedly stored, the memory of the terminal can be effectively used.

The foregoing and other objects, features, aspects and advantages of the present invention will become more apparent from the following detailed description of the present invention when taken in conjunction with the accompanying drawings.

DETAILED DESCRIPTION OF THE INVENTION

Figure 1:
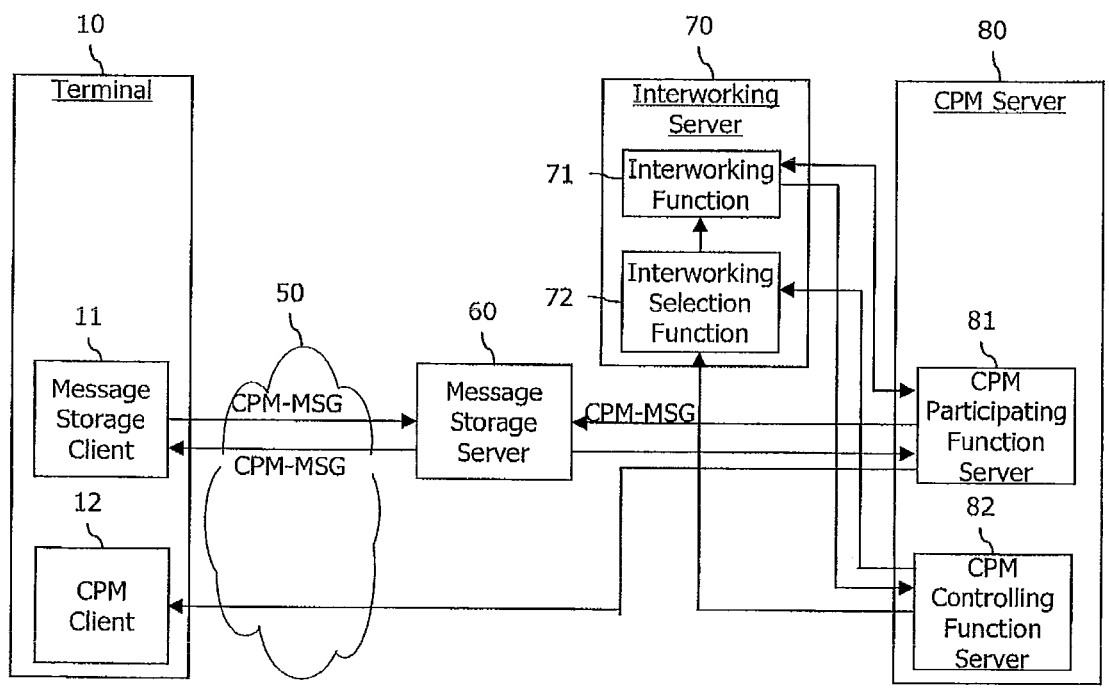
FIG. 1 is a schematic block diagram showing the configuration of a network and a terminal for a converged IP messaging (CPM) service.
Figure 2:
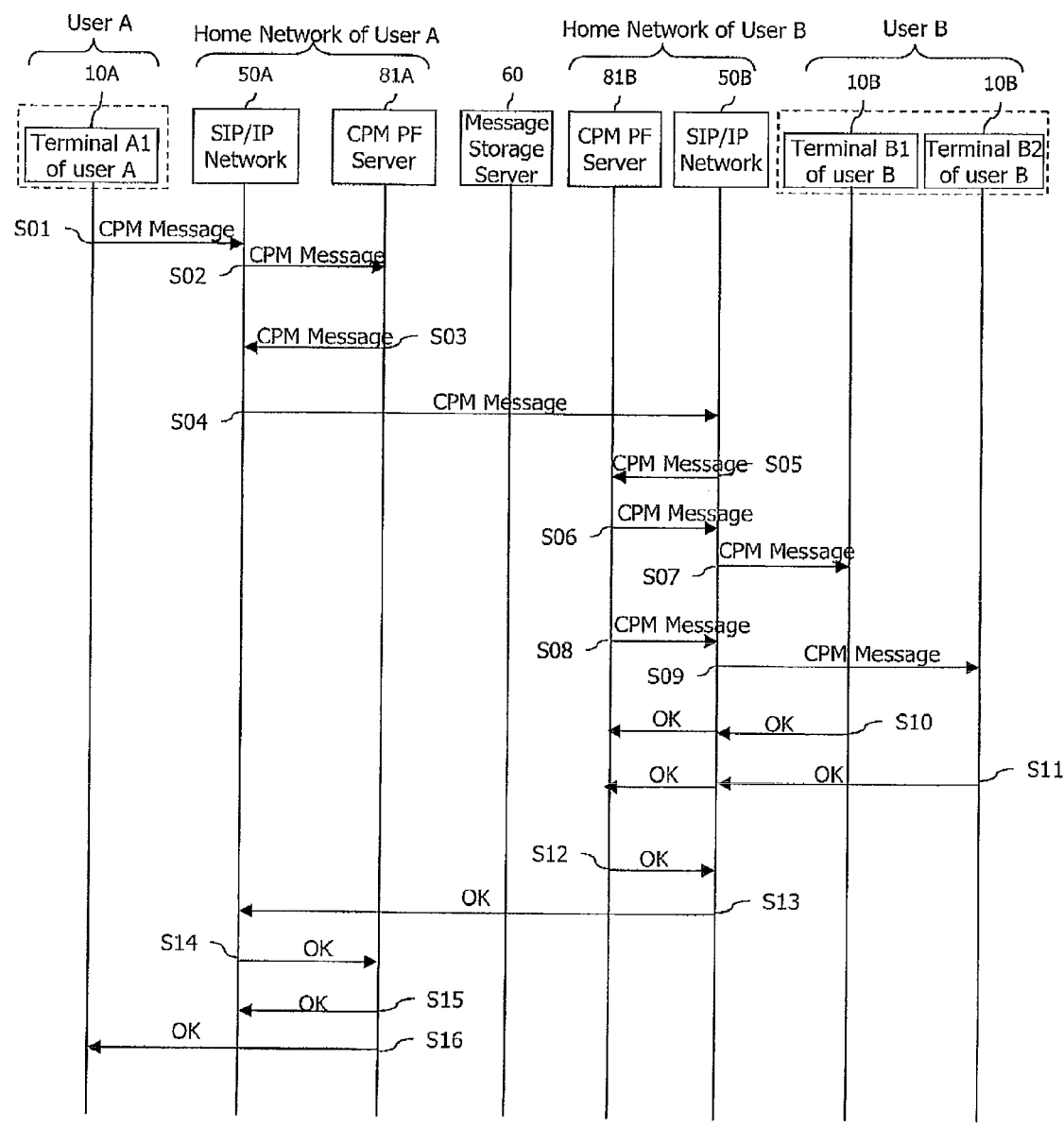
FIG. 2 illustrates the process of transmitting and receiving a CPM message.
Figure 3:
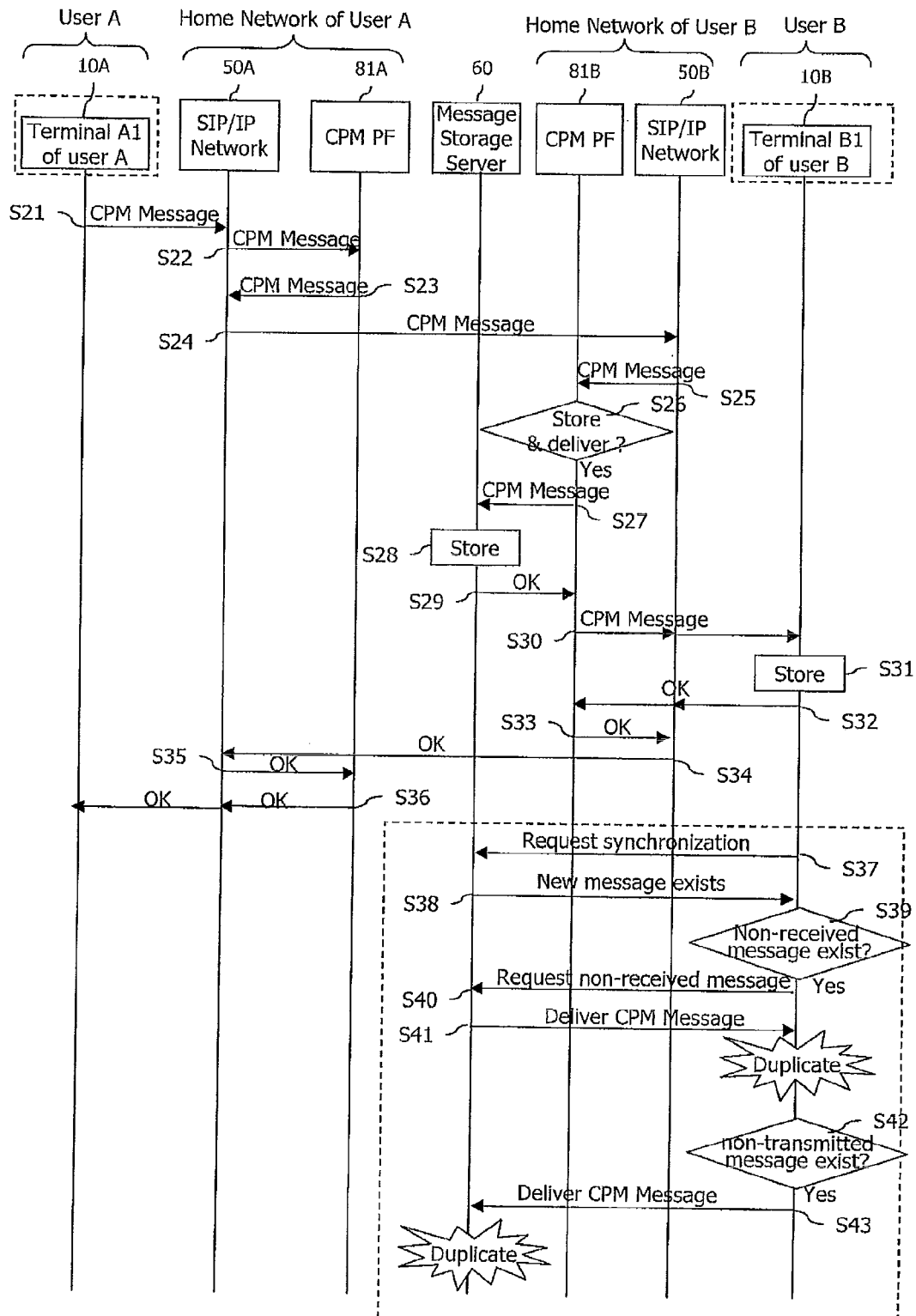
FIG. 3 is a flow chart illustrating an operation of a message storage server of FIG. 1 and a message synchronization process.

The present invention may be applicable to a CPM message service. However, the present invention may be also applicable to all kinds of message services to which the technical spirit of the present invention is applicable, for instance, SMS, EMS, MMS, and the like.

It should be noted that technological terms used herein are merely used to describe a specific embodiment, but not to limit the present invention. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

The terms used herein including an ordinal number such as first, second, etc. can be used to describe various elements, but the elements should not be limited by those terms. The terms are used merely to distinguish an element from the other element. For example, a first element may be named to a second element, and similarly, a second element may be named to a first element.

In case where an element is "connected" or "linked" to the other element, it may be directly connected or linked to the other element, but another element may be existed therebetween. On the contrary, in case where an element is "directly connected" or "directly linked" to another element, it should be understood that any other element is not existed therebetween.

Hereinafter, preferred embodiments of the present invention will be described in detail with reference to the accompanying drawings, and the same or similar elements are designated with the same numeral references regardless of the numerals in the drawings and their redundant description will be omitted. In describing the present invention, moreover, the detailed description will be omitted when a specific description for publicly known technologies to which the invention pertains is judged to obscure the gist of the present invention. Also, it should be noted that the accompanying drawings are merely illustrated to easily explain the spirit of the invention, and therefore, they should not be construed to limit the spirit of the invention by the accompanying drawings. The spirit of the invention should be construed as being extended even to all changes, equivalents, and substitutes other than the accompanying drawings.

DEFINITION OF TERMS

Converged IP Messaging (CPM): Converged IP messaging service

CPM Client: A client software program capable of transmitting and/or receiving CPM messages as illustrated in FIG. 1.

Message Storage Client: It stores transmitted and received messages, and performs synchronization with a message storage server as illustrated in FIG. 1.

CPM Participating Function (PF) Server: It performs a role of delivering a message to the CPM client as illustrated in FIG. 1. Furthermore, it performs a role of delivering a message to the message storage server 60 as illustrated in FIG. 1. In addition, it performs a role of receiving a converted message from the interworking function unit 71 as illustrated in FIG. 1. And It performs a role of determining whether or not an interworking function is performed.

Message Storage Server: It stores a message received from a CPM PF server, and performs synchronization with a message storage client 11 as illustrated in FIG. 1.

Interworking Selection Function: It performs a role of determining which Interworking Function can be appropriate.

Interworking Function: It performs a role of converting a CPM message into SMS, MMS, and the like, or converting SMS, MMS, and the like to a CPM message.

Internet Messaging Access Protocol (IMAP): A communication protocol for reading a mail from an Internet mail server.

CPM Large Message Mode: A mode for transmitting a large-sized CPM message using Message Session Relay Protocol (MSRP).

CPM Pager Mode: A mode for transmitting and receiving a limited sized CPM message without setting a MSRP session.

CPM Session: An interaction made between two or more participants for exchanging CPM messages/continuous media.

Hereinafter, a terminal is illustrated in FIGS. 4 through 9, but the terminal may be also called UE (User Equipment), ME (Mobile Equipment), and MS (Mobile Station). Furthermore, the terminal may be portable equipment such as a portable phone, a PDA, a smart phone, and a notebook, or non-portable equipment such as a PC, and a vehicle-loaded device.

Figure 4:
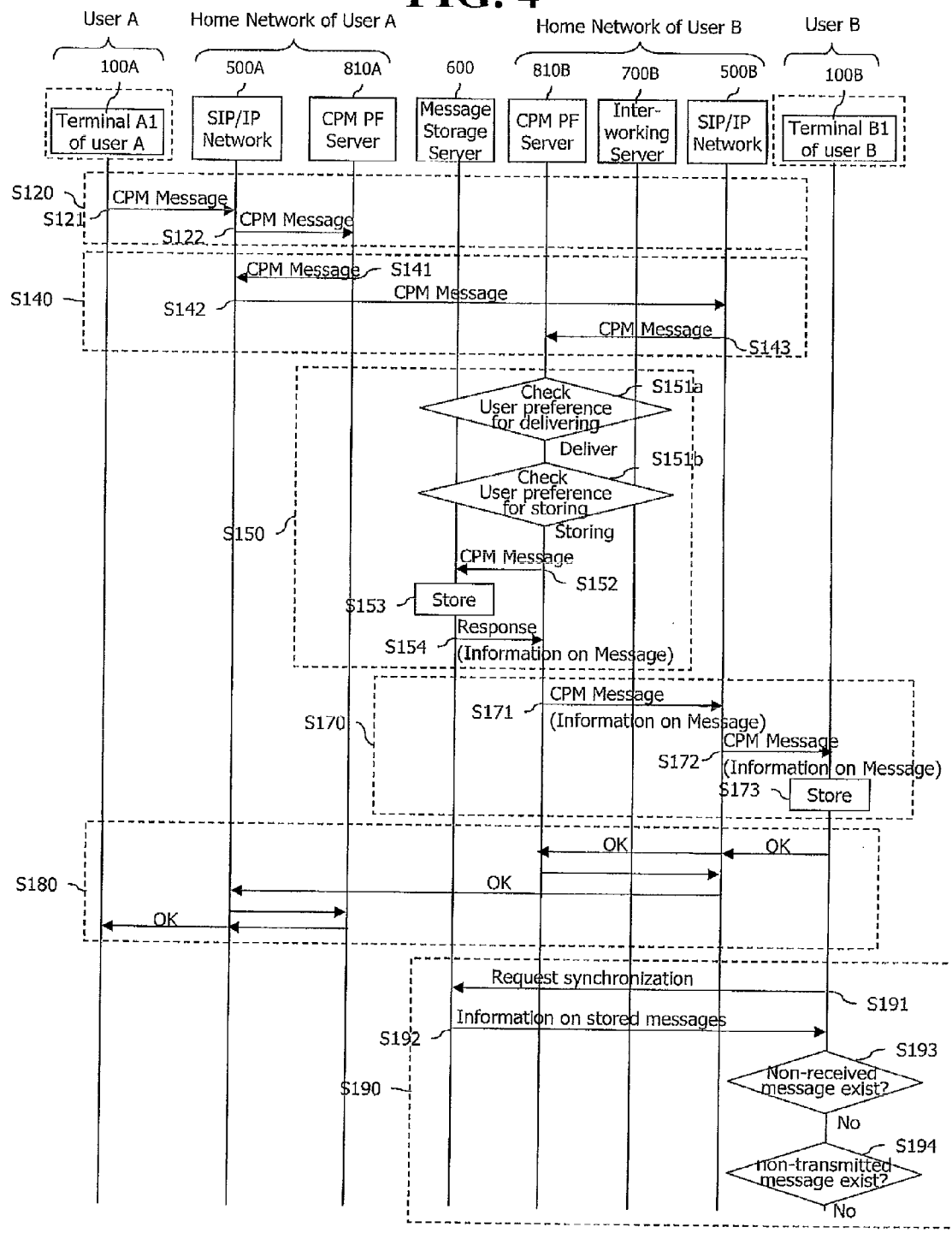
FIG. 4 is a flow chart illustrating a first exemplary embodiment of the present invention.

FIG. 4 is a flow chart exemplarily illustrating a first embodiment of the present invention.

In the first exemplary embodiment as illustrated in FIG. 4, a CPM page mode is shown. Also, FIG. 4 illustrates the case where when the terminal B1 of the user B receives, a delicately (or repeatedly) receiving and storing is prevented.

In FIG. 4, there are illustrated a terminal A1 100A of a user A, a terminal B1 100B of a user B, a home network of the user A, a home network of the user B, and a message storage server 600. The home network of the user A may include a SIP/IP network 500A and a CPM PF server 810A. The home network of the user B may include a SIP/IP network 500B and a CPM PF server 810B.

In FIG. 4, there are illustrated procedures (S120) of transmitting a CPM message by the terminal A1 100A of the user A, procedures (S140) of delivering the CPM message to a CPM PF server within a home network of the user B, a procedure (S150) of checking user preference and storing the CPM message, procedures (S170) of delivering the CPM message to the terminal B1 of the user B, procedures (S180) of transmitting a response message with respect to the CPM message, and synchronization procedures (S190).

1) First, the procedures (S110) of transmitting a CPM message by the terminal A1 100A of the user A will now be described.

The terminal A1 (100A) transmits a CPM message to the CPM PF server 810A through the SIP/IP network 500A according to a request of the user A (S121, S122).

At this time, in case where the size of the CPM message is 1300 bytes or smaller, the CPM message is encapsulated within a SIP MESSAGE and then transmitted. A CPM feature tag indicating the CPM message is included within the CPM message.

Although not shown, in case where the message transmitted by the terminal A1 100A is a different type of message (for instance, SMS, MMS, or email), not a CPM message, the different type of message passes through the interworking function unit of the interworking server, so as to be converted into a CPM message. If the converted CPM message does not exceed 1300 bytes, then the interworking function unit transmits the CPM message based on a CPM page mode. If the converted CPM message exceeds 1300 bytes, the interworking function unit transmits the message according to a CPM large message mode.

2) Next, procedures (S140) of delivering the CPM message to a CPM PF server within a home network of the user B will now be described.

When the CPM PF server 810A within a home network of the user A receives the CPM message, the CPM PF server 810A delivers the CPM message to the CPM PF server 810B within a home network of the user B through the SIP/IP network 500A within the home network of the user A and the SIP/IP network 500B within the home network of the user B (S141, S142, and S143).

3) Next, the procedures (S150) of checking user preference and storing the CPM message will now be described.

When the CPM PF server 810B within the home network of the user B receives the CPM message, the CPM PF server 810B checks the user preference (or user settings) of the user B (S151). It will now be described in detail.

(a) First, the CPM PF server 810B within the home network of the user B determines whether or not the message is to be rejected. In other words, the CPM PF server 810B checks whether or not a CPM address of an authorized sender of the received CPM message should be rejected according to the access policy. To this end, the CPM PF server 810B checks, for example, the following access policy with respect to the received message. The above checking may include i) checking a feature tag, ii) checking whether or not the message is a pager mode message, iii) checking the conditions of the origination user (i.e., the sender) (for example, checking an identity of the sender (e.g., phone number, e-mail address, etc.), and iv) checking whether or not it is permitted.

Referring the feature tag, for example, the CPM PF server 810B checks whether or not the <conditions> element is set as "true" with respect to the CPM service by evaluating the <service-list> element and the <service> element in which a value "feature tag" is set (CPM PF server checks for rules where the <conditions> element evaluates to true for the CPM service by evaluating the <service-list> elements and <service> elements with the attribute "feature tag" the value).

Referring to the pager mode message, for example, the CPM PF server 810B checks whether or not the <media-list>, a lower element of the <conditions>, is set as "true" for the CPM media pager-mode message.

Referring to the conditions of the originator (i.e., the sender), for example, the CPM PF server 810B checks whether or not it is set as "true" within the <conditions> element for the sender of the CPM message. (For example, it may be an identity of the sender (e.g., phone number, e-mail address, etc.)

Referring to checking whether or not it is permitted, the CPM PF server 810B checks whether or not it is set as "true" with respect to the CPM media pager mode message having a value "true" within the <allow-reject-invite> action element. (The CPM PF Server Check for rules that evaluates to true for the CPM media pager mode message with the value "true" in the <allow-reject-invite> action element). If the rules are checked as true, then the received CPM message is rejected. The checking of whether or not it is permitted is performed when the rules i), ii), and iii) exist. If the rules i), ii), and iii) do not exist, the process will go to the following process (b) or (c).

(b) Next, when the CPM message is an anonymous message, the CPM PF server 810B checks an element related to the anonymous message according to the user preference (or user settings) or service provider policy. If the anonymous message is not supported, the CPM PF server 810B does not deliver the received message to the user and transmits an error message to the sender.

(c) Next, the CPM PF server 810B checks whether the size of the message is satisfied or the content of the message is satisfied according to the service provider policy. If those are not satisfied, CPM PF server 810B rejects the received message.

(d) When an Expire header is included in the received message, the CPM PF server 810B determines whether or not it has expired based on the header value. When the received message has expired, the CPM PF server 810B rejects the received message.

The above-described procedures (a), (b), (c), and (d) may be interchanged in the order.

When the CPM PF server 810B determines to receive the message, it performs a process of checking whether there is a terminal that can receive the message. To this end, the CPM PF server 810B checks the user preference for a message delivery (S151*a*) and searches terminals which have been registered (namely, connected) to the user B. And then, the CPM PF server 810B checks whether there is a terminal that can receive the message by checking the terminals in consideration of the user preference (namely, per-device user preference), device capability, device connectivity, service provider policy, and the like, with respect to each of the searched terminals.

Meanwhile, if there is no reception-available terminal, the CPM PF server 810B checks the user preference in order to determine whether to defer the message, whether to notify the user about the deferred message after deferring, whether to interwork the message, whether to redirect the message, or whether to store the message. Or, if there is a terminal that can receive the message, the CPM PF server 810B determines whether the message is stored.

If the message is determined to be deferred, the CPM PF server 810B stores the message (e.g., temporarily stores the message), without delivering it. If the message is determined to be interworked, the CPM PF server 810B delivers the CPM message to the interworking selection function unit of the interworking server 700B, and the interworking selection function unit determines a type to which the CPM message is to be changed. In this case, the service provider's policy, user preference of the terminal B1 100B, or the characteristics of the CPM message may be considered when determining the above. The interworking selection function unit requests the interworking function unit to convert the CPM message into the determined type of message, and the interworking function unit then converts the CPM message into the determined type of message.

Meanwhile, the order of checking the user preference may change as follows. For example, when the CPM PF server 810B receives the CPM message, it checks a general user preference (i.e., general user preference) commonly applied for every terminal, namely, an <action> element in order to determine whether to defer the received CPM message, whether to notify the user after deferring the received CPM message, or whether to interwork, store or redirect the received CPM message. If the general user preference does not correspond to any of the values, the CPM PF server 810B may determine to deliver the received CPM message. When the CPM PF server 810B determines to deliver the received CPM message, the CPM PF server 810B searches registered (namely, connected) terminals of the user B to select a reception-available terminal over its message delivery. In this case, the CPM PF server 810B may check one or more of the user preference (namely, per-device user preference profile), a device capability, a device connectivity, and a service provider policy of each of the searched terminals to find a terminal that can receive the message. Meanwhile, when CPM PF server 810B determines to deliver or interwork the message, it checks whether or not the value of an element related to a message record (e.g., user preference for recording CPM conversation history) has been set as true or active indicating storing within the user preference (S151*b*).

When the message is determined to be stored (namely, recorded) and delivered through the process of checking the user preference, the CPM PF server 810B transmits the CPM message to the message storage server 600 (S152). In this case, the CPM PF server 810B delivers the CPM message to the message storage server 600 by using an IMAP Command.

The message storage server 600 stores the CPM message (S153), and transmits a response message including information regarding the CPM message stored in the storage server 600 (e.g., an identification (i.e., an identifier) (ID) or a unique identification (UID) allowing for discrimination of the message from a plurality of messages stored in the storage server 600) to the CPM PF server 810B (S154). The ID or the UID may be generated according to RFC3501.

4) The procedure of delivering the CPM message to the terminal B1 of the user B will now be described.

When the CPM PF server 810B receives the response message including the information regarding the CPM message (e.g., an ID or a unique identification (UID) allowing for discrimination of the message from a plurality of messages stored in the storage server 600) from the message storage server 600, it extracts the information from the response message and includes the extracted information in the CPM message. And the CPM PF server 810B transmits the information-included CPM message to the terminal B1 100B of the user B via the SIP/IP network 500B (S171 and S172).

For the transmission, the CPM PF server 810B performs the following process.

The CPM PF server 810B selects a terminal to which the message is to be transmitted by combining (i.e., putting together) the user preference, the device connectivity, the device capability, the service provider policy, and the like, checked in step S151*a*. Here, the user preference set for each terminal may differ in consideration of the characteristics of each terminal. For example, if a terminal 1 is a personal computer (PC) and a terminal 2 is a phone provided by an office or firm for a business purpose, there may be set such that office-related messages are received only by the terminal 2. The device connectivity indicates whether or not a terminal has been registered to the CPM network. The device capability indicates whether or not a terminal is capable of receiving the message.

If a plurality of terminals can receive the message, the CPM PF server 810B duplicates the CPM message for each terminal. And then, the CPM PF server 810B includes the address (i.e., GRUU) of each terminal in a reception address of the duplicated CPM messages (namely, the reception address has the form of the address (e.g., phone number) of a recipient with the unique address of each terminal added thereto). The address of each terminal is generated when each terminal registers to the SIP/IP core network, and the CPM PF server 810B can obtain the address of each terminal by being subscribing to the SIP/IP core network. The CPM PF server 810B includes a file ID obtained in step S154 in FIG. 4 in the CPM message. The information may be included in the text of the CPM message or may be included in a head part. When the terminal B1 100B receives the CPM message, it extracts the information from the CPM message and stores the CPM message and the information (S173).

5) The procedure for transmitting a response message with respect to the CPM message (S180) will now be described. The terminal B1 100B transmits a response message, e.g., an SIP-based 200 OK message, with respect to the CPM message, to the CPM PF server 810B via the SIP/IP network 500B.

If the CPM PF server 810B fails to deliver the message to the target terminal, the CPM PF server 810B may defer the delivery-failed message according to the operator policy and inform the user about the deferred message or may select interworking. In this case, the CPM PF server 810B may delete the CPM message stored in the message storage server.

The CPM PF server 810B transmits the response message to the CPM PF server 810A via the SIP/IP networks.

In this case, if there are a plurality of terminals over the user B, when a first response message, among response messages from the plurality of terminals, is received, the CPM PF server 810B transmits the first response message to the CPM PF server 810A.

Upon receiving the response message, the CPM PF server 810A delivers the response message to the terminal A1 100A of the user A.

6) The synchronization procedure (S190) will now be described.

The terminal B1 100B transmits a synchronization request message to the message storage server 600 for its synchronization with the message storage server 600 (S191).

Then, the message storage server 600 transmits information about the messages stored in the message storage server 600 itself (e.g., information regarding all the stored messages or information regarding a message which has been the most recently stored) (namely, Ds of all the stored messages or the ID of the message which has been most recently stored) to the terminal B1 100*b* (S192).

Then, based on the received information, the terminal B1 100B checks whether there is a message that has not been received and also checks whether there is a message that has not been transmitted (S194). For example, it is assumed that the ID of the CPM message stored in step S153 is 4 and the terminal B1 100B has received the CPM message including the ID 4 in step S172. Also, it is assumed that the message storage server 600 has transmitted the ID 4 of the CPM message, which has been the most recently stored, to the terminal B1 100B. Then, the terminal B1 100B determines that there is no message which has not been received by comparing the ID 4 that the terminal B1 100B has and the received ID 4. Also, the terminal B1 100B determines that there is no message it has not transmitted by comparing the ID 4 that the terminal B1 100B has and the received ID 4.

As described above, according to the first exemplary embodiment of the present invention, because the terminal B1 100B does not repeatedly receive messages, the network resources and the memory can be effectively used.

Figure 5:
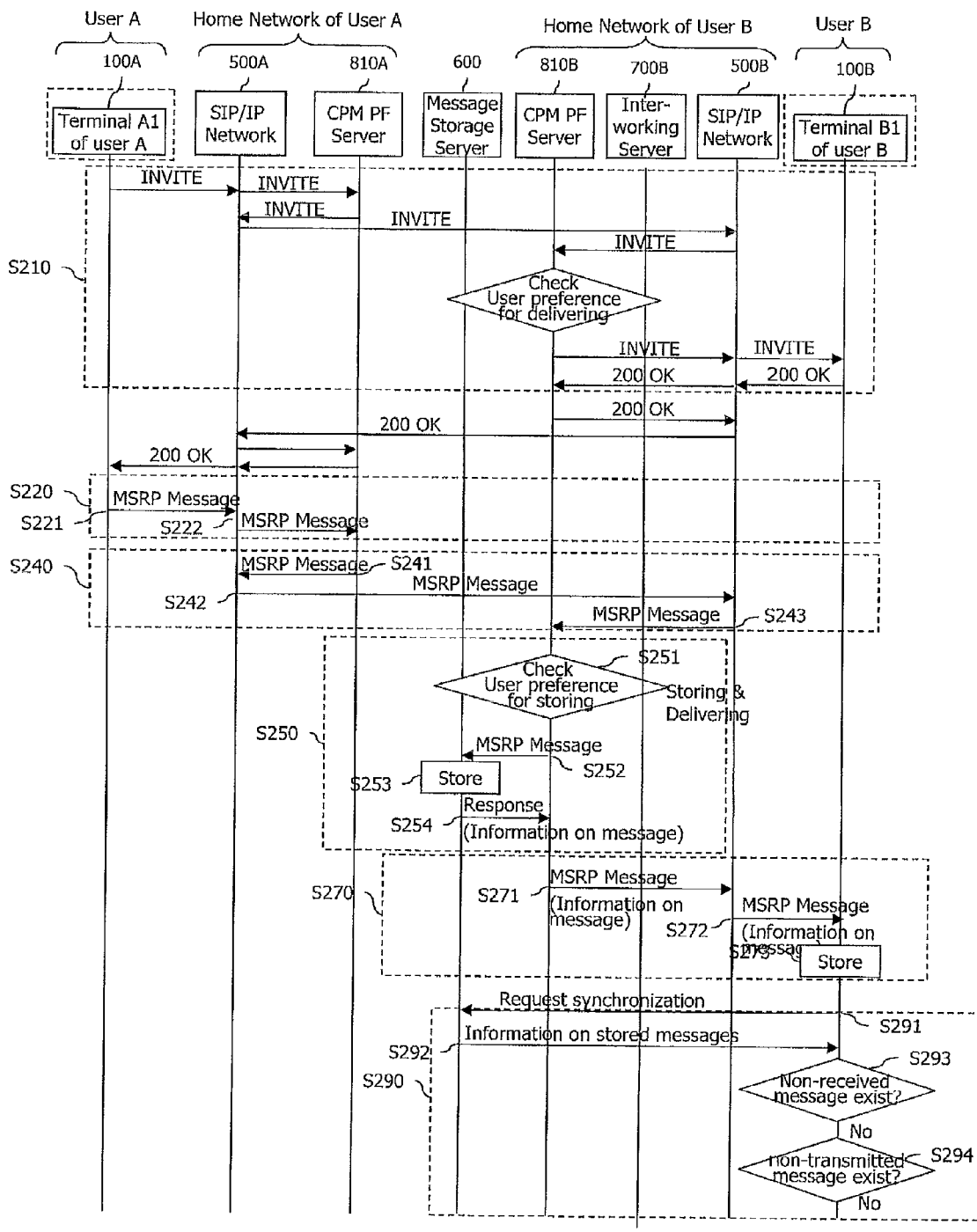
FIG. 5 is a flow chart illustrating a second exemplary embodiment of the present invention.

FIG. 5 is a flow chart illustrating a second exemplary embodiment of the present invention.

FIG. 5 illustrates transmission and reception of a CPM large mode message according to the second exemplary embodiment of the present invention. In the second exemplary embodiment of the present invention, a repeated receiving and storing of a CPM message is prevented when the terminal B1 of the user B receives the CPM message.

FIG. 5 shows step S210 of establishing a session by the terminal A1 100A of the user A, the procedure S220 of transmitting the CPM large mode message by the terminal A1 100A of the user A, the procedure S240 of delivering the CPM large mode message to the CPM PF server within the home network of the user B, the procedure S250 of checking a user preference and storing the CPM large mode message, the procedure S270 of delivering the CPM large mode message to the terminal B1 of the user B, and the synchronization procedure S290. Although not shown in FIG. 5, a procedure of transmitting a response message with respect to the CPM large mode message is performed between the delivery procedure S270 and the synchronization procedure S290 like in the case as illustrated in FIG. 4. Content of FIG. 4 will be applied in the process of transmitting a response message with respect to the CPM large mode message.

Also, only content different from the procedures of FIG. 4 will be described and content of FIG. 4 will be used in the description of the similar procedure.

1) The procedure S210 of establishing a session by the terminal A1 100A of the user A will now be described.

When the user A requests to send, for example, a message exceeding 1300 bytes, the terminal A1 100A transmits a session invitation message, e.g., an SIP-based INVITE message, to the CPM PF server 810A via the SIP/IP network 500A within the home network of the user A in order to transmit the message.

When the CPM PF server 810A within the home network of the user A receives the session invitation message, it delivers the session invitation message to the CPM PF server 810B within the home network of the user B via the SIP/IP network 500A within the home network of the user A and the SIP/IP network 500B within the home network of the user B.

When the CPM PF server 810B within the home network of the user B receives the session invitation message, (a) it determines whether to reject the CPM message. Namely, the CPM PF server 810B checks whether or not the CPM address of the authenticated originator (or sender) within the received session invitation message is to be rejected according to the access policy. To this end, the CPM PF server 810B checks, for example, the following access policy with respect to the received session invitation message. The checking includes: 1) checking a feature tag, ii) checking whether or not it is a large mode message, iii) checking the conditions of the origination user (e.g., the identity of the sender (e.g., a phone number, e-mail address, etc.), and iv) checking whether or not it is permitted. In this case, in checking the feature tag, the CPM PF server 810B checks whether or not the feature tag indicates a large mode message (Upon receiving a SIP INVITE request with the CPM Feature Tag '3gpp-service-.ims.icsi.oma.cpm.largemsg' corresponding to Large Message Mode CPM Message, the CPM Participating Function SHALL execute the following).

(b) When the session invitation message is an anonymous message, the CPM PF server 810B checks an element related to the anonymous message according to the user preference (or user settings) or the service provider policy.

(c) The CPM PF server 810B checks whether or not the size of the message supported according to the service provider policy is satisfied or whether or not content of the message is satisfied. If the message size is not satisfied or if the content of the message is not satisfied, the CPM PF server 810B rejects the received message.

(d) When the received message includes an expire header, the CPM PF server 810B determines whether or not the received message has expired based on the header value. When the received message has expired, the CPM PF server 810B rejects the received message.

(e) The CPM PF server 810B may determine a user preference related to the size of the received message. In detail, the CPM PF server 810B checks max-size attribute value of 'Large-Message' element of <Media-List> of the user preference.

The order of the processes (a), (b), (c), and (d) may be interchanged, and detailed content of them is similar to the above description, so a detailed description thereof will be omitted.

When the CPM PF server 810B determines to receive the message, without rejecting it, through the processes (a), (b), (c), (d), and (e), the CPM PF server 810B performs a reception-available terminal checking process. To this end, the CPM PF server 810B checks the user preference for a message delivery and searches registered (namely, connected) terminals of the user B. And the CPM PF server 810B checks the searched terminals to find whether there is a terminal that can receive the message, in consideration of the user preference (namely, the per-device user preference, the device capability, the device connectivity, the service provider policy, etc.).

If there is no terminal that can receive the message, the CPM PF server 810B checks the user preference (user preference) to determine whether or not the message is to be deferred, whether or not it is to notify the user about the deferred message after deferring the message, whether or not interworking is to be performed on the message, whether or not the message is to be redirected to a different terminal, or whether or not the message is to be stored.

When the message is determined to be delivered, the CPM PF server 810B transmits the session invitation message to the terminal B1 100B via the SIP/IP network 500B.

When the user B accepts a session establishment, the terminal B1 100B transmits a response message, e.g., an SIP-based 200 OK message, to the CPM PF server 810B via the SIP/IP network 500B.

Upon receiving the response message, the CPM PF server 810B prepares to receive an MSRP message. And the CPM PF server 810B transmits the response message to the CPM PF server 810A within the home network of the user A via the SIP/IP network 500A within the home network of the user A and the SIP/IP network 500B within the home network of the user B.

Upon receiving the response message, the CPM PF server 810A prepares to receive the MSRP message. And the CPM PF server 810A transmits the response message to the terminal A1 100A via the SIP/IP network 500A.

2) Next, a procedure (S220) of transmitting a CPM large mode message by the terminal A1 100A of the user A is performed. The procedure S220 will now be described.

When the terminal A1 100A receives a message text having a size of 100 bytes or larger from the user A, the terminal A1 100A generates a CPM large mode message, encapsulates the generated CPM large mode message into an MSRP-based message, and transmits it to the CPM PF server 810A via the SIP/IP network 500A (S221 and S222).

3) And then, a procedure (S240) of delivering the CPM large mode message to the CPM PF server within the home network of the user B is performed. The delivery procedure (S240) is similar to the step S140 in FIG. 4, thus the description of the procedure S140 will be used.

4) In addition, a procedure (S250) of checking the user preference and storing the CPM large mode message is performed.

When the message is determined to be delivered or it is determined that interworking is performed on the message, the CPM PF server 810B checks whether or not the value of the element related to the message record within the user preference (user preference) has been set as a value indicating storing such as true or active (S251).

In this case, checking of the element related to the message record may be performed when the session invitation message is received.

When the message is determined to be stored (namely, recorded) and delivered, the CPM PF server 810B transmits the CPM message to the message storage server 600 (S252). In this case, the CPM PF server 810B delivers the CPM message to the message storage server 600 by using an IMAP command.

A detailed procedure S250 is similar to the procedure S150 of FIG. 4, so the description of the procedure S150 will be used.

5) Thereafter, a procedure S270 of transferring the CPM large mode message to the terminal B1 of the user B is performed.

When the CPM PF server 810B receives the response message including the information regarding the CPM message (e.g., an identification or UID allowing for discrimination of the message from the plurality of messages stored in the message storage server 600) from the message storage server 600, the CPM PF server 810B extracts the information from the response message and includes the extracted information in the MSRP message. And, the CPM PF server 810B transmits the information-included MSRP to the terminal B1 100B of the user B via the SIP/IP network 500B (S271 and S272). The information may be included in the text of the CPM message or may be included in the head part.

Table 1 below illustrates the configuration of the MSRP message including the information. The information may be included in the text or may be included in the head part.

TABLE 1

MSRP d93kswow SEND
To-Path : msrp://bobpc.example.com:888/94di4eeewzd;tcp
From-Path: msrp://alicepc.example.com:7654/iau39soe2843;tcp
Message-ID: 12339sdqwer
Byte-Range: 1-137/148
Content-Type: message/cpim
To: Bob sip:bob@example.com
From: Alice sip:alice@example.com
DateTime: 2006-05-15T15:02:31-03:00
Content-Type: text/;lain
   NS:      cpm
    <urn:oma:params:cpm>

TABLE 1-continued

```
Cpm.message-uid:
    4827313
ABCD
-----d93kswow+
```

Meanwhile, when the message is determined to be stored by the element related to the message record, the CPM PF server 810B waits until when MSRP SEND chunks is completely received, and then transmits the message.

6) Although not shown in FIG. 5, a procedure of transmitting a response message with respect to the CPM large mode message is performed between the delivery procedure S270 and a synchronization procedure S290 in a similar manner as the case shown in FIG. 4. For the procedure of transmitting the response message with respect to the CPM large mode message, the content of FIG. 4 will be used. When the terminal A1 100A of the user A receives the response message, the terminal A1 100A transmits a session termination message, e.g., an SIP-based BYE message, in order to terminate the established session. The BYE message reaches the terminal B1 100B of the user B via the SIP/IP networks 500A and 500B.

7) Subsequently, the synchronization procedure S290 is performed. The synchronization procedure S290 is similar to the procedure S190 of FIG. 4, so the description of the procedure S190 will be used.

As described above, according to the first exemplary embodiment of the present invention, the terminal B1 100B does not receive a message repeatedly, the network resources and the memory can be effectively used.

Figure 6:
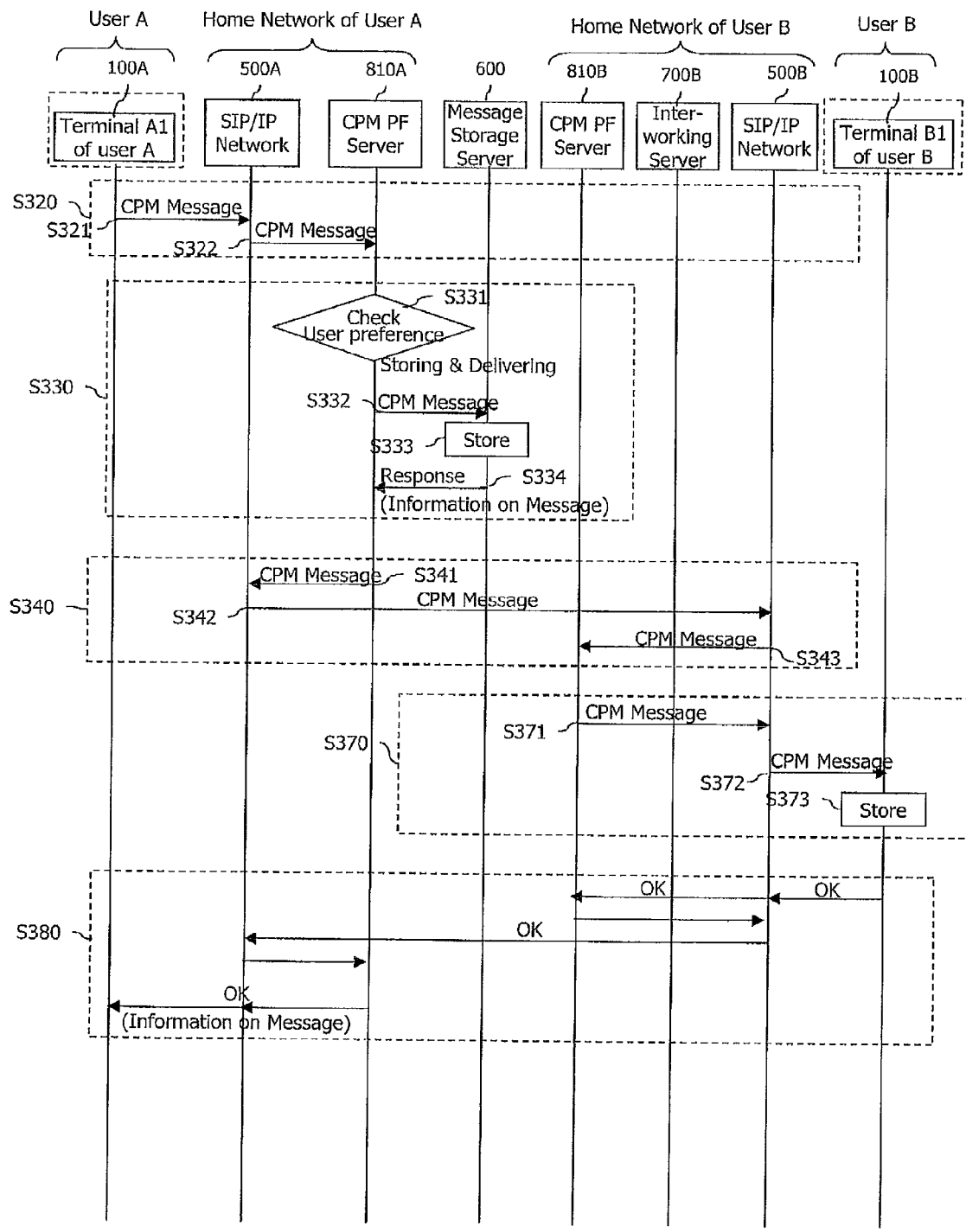
FIG. 6 is a flow chart illustrating a third exemplary embodiment of the present invention.

FIG. 6 is a flow chart illustrating a third exemplary embodiment of the present invention.

FIG. 6 illustrates the case of CPM page mode, showing a situation that a CPM message transmitted by the terminal A1 100A of the user A is stored in the message storage server 600. In this situation, the terminal A1 100A is prevented from receiving the CPM message it has transmitted in the synchronization procedure.

FIG. 6 illustrates a procedure S320 of transmitting the CPM message by the terminal A1 100A of the user A, a procedure S330 of checking the user preference (user preference) and storing the CPM message by the CPM PF server 810A within the home network of the user A, a procedure S340 of delivering the CPM message to the CPM PF server within the home network of the user B, a procedure S370 of delivering the CPM message to the terminal B1 of the user B, and a procedure S380 of transmitting a response message with respect to the CPM message.

1) First, the procedure S320 of transmitting the CPM message by the terminal A1 100A of the user A is performed. The procedure S320 is similar to the procedure S120 in FIG. 4, so the description of the procedure S120 will be used.

2) Next, the procedure S330 of checking the user preference (user preference) and storing the CPM message by the CPM PF server 810A within the home network of the user A is performed.

In detail, when the message from the terminal A1 100A is received by the CPM PF server 810A, the CPM PF server 810A checks whether or not the user A of the terminal A1 100A is an authenticated user to which the message can be transmitted.

If the CPM message is an anonymous message, the CPM PF server 810A checks whether to reject the anonymous message.

And, the CPM PF server 810A checks the user preference (or the user preference) of the user A (S331). Namely, the CPM PF server 810A checks the element related to the message record within the user preference (e.g., the user preference for recording CPM conversation history) and determines whether to store and deliver the message.

If the message is determined to be stored and then delivered, the CPM PF server 810A transmits the CPM message to the message storage server 600 (S332). In this case, the CPM PF server 810A delivers the CPM message to the message storage server 600 by using an IMAP command.

The message storage server 600 stores the CPM message (S333) and transmits a response message including information regarding the CPM message stored in the message storage server 600 (e.g., an identification or a UID allowing for discrimination of the message from the plurality of messages stored in the message storage server 600) to the CPM PF server 810A (S334). The identification or the UID may be generated according to RFC3501.

3) The procedure S340 of delivering the CPM message to the CPM PF server within the home network of the user B is performed. The procedure S340 is similar to the procedure S140 of FIG. 4, so the description of the procedure S140 will be used.

4) The procedure (S370) of delivering the CPM message to the terminal B1 100B of the user B is performed. The procedure S370 is similar to the procedure S170 of FIG. 4, so the description of the procedure S170 will be used.

5) The procedure (S380) of transmitting a response message with respect to the CPM message is performed.

The procedure S380 is similar to the procedure S180 of FIG. 4, so the description of the procedure S180 will be used and only different content will be described. When the CPM PF server 810A within the home network of the user A receives the response message, it includes the information regarding the message received in the procedure S334 in the response message and transmits the same to the terminal A1 100A.

Then, the terminal A1 100A stores both the CPM message it had transmitted and the information (e.g., the identification information or UID) regarding the message.

Accordingly, although the terminal A1 100A performs synchronization with the message storage server 600, it does not receive the message it had transmitted from the message storage server 600.

Figure 7:
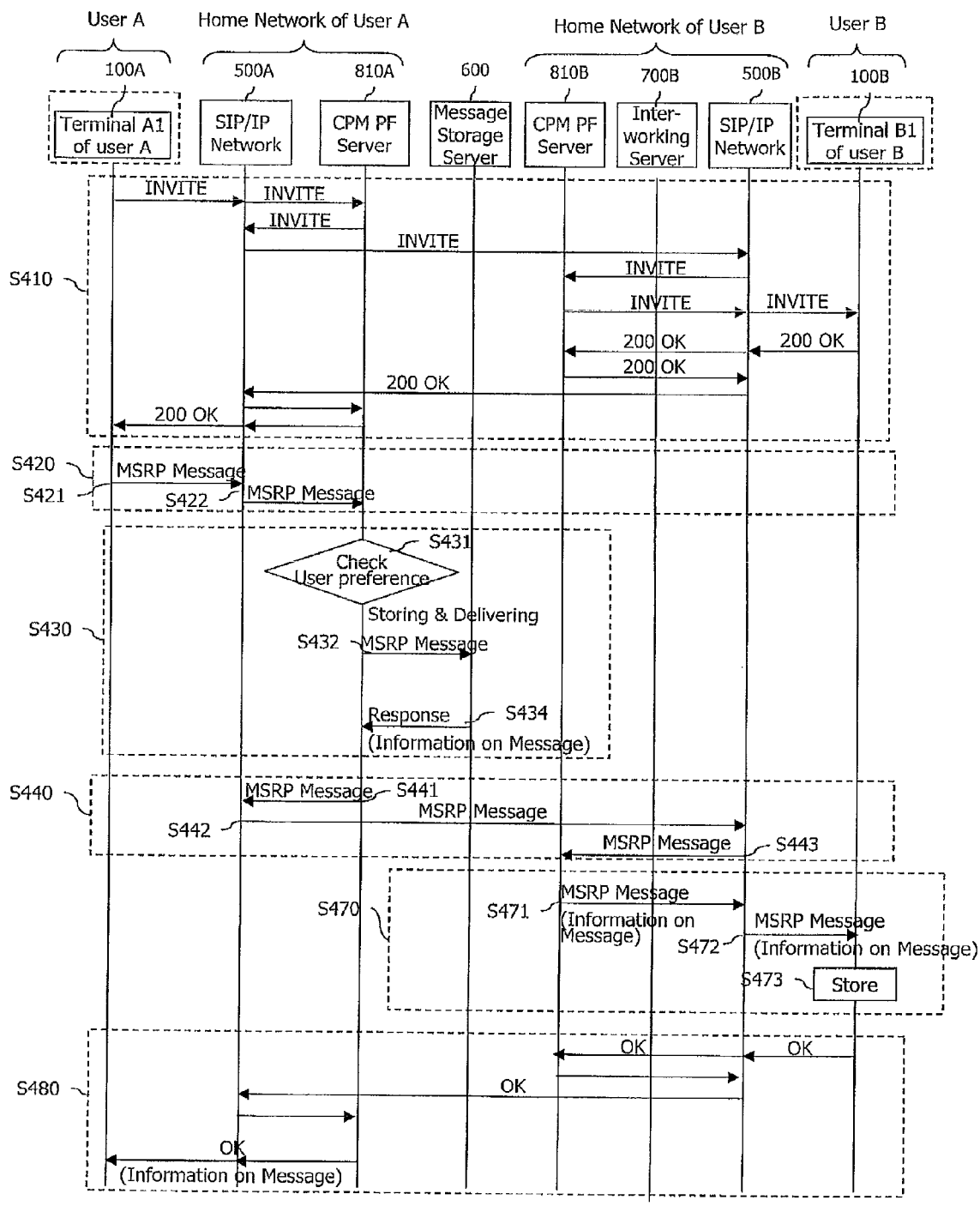
FIG. 7 is a flow chart illustrating a fourth exemplary embodiment of the present invention.

FIG. 7 is a flow chart illustrating a fourth exemplary embodiment of the present invention.

FIG. 7 illustrates transmission and reception of a CPM large mode message, showing a situation that a CPM message transmitted by the terminal A1 100A of the user A is stored in the message storage server 600. In this situation, the terminal A1 100A is prevented from receiving the CPM large mode message it has transmitted in the synchronization procedure.

The fourth exemplary embodiment as illustrated in FIG. 7 can be easily understood by the skilled person in the art from the description of the second and third exemplary embodiments of the present invention, so its repeated description will be omitted.

In the first to fourth exemplary embodiments as described above, a transmitted and received message is stored in the message storage server, and when synchronization procedure is performed, the message is not repeatedly transmitted and received.

However, in a CPM conversation, there exists a CPM session as well as the CPM message. Hereinafter, the CPM session is stored in the message storage server. In storing the CPM session, a control signal with respect to the session, for example, an SIP-based INVITE message or an SIP-based BYE message, can be also stored in the message storage server 600.

Figure 8:
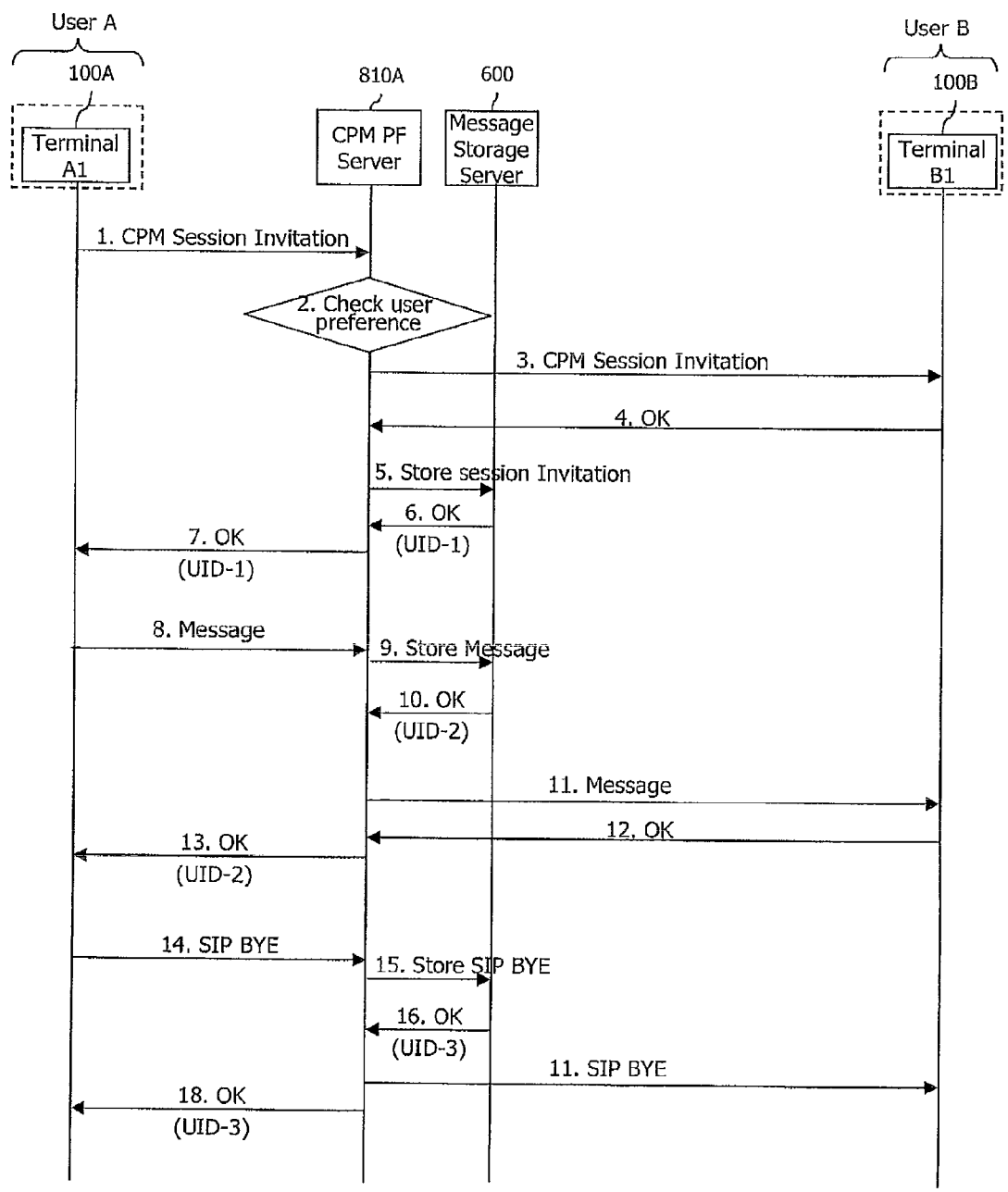
FIG. 8 is a flow chart illustrating a fifth exemplary embodiment of the present invention.

FIG. 8 is a flow chart illustrating a fifth exemplary embodiment of the present invention.

FIG. 8 shows the case where a session control (invitation and/or termination) message and a general message transmitted by the terminal A1 100A of the user A are stored in the message storage server.

As noted with reference to FIG. 8, when the message storage server 600 stores the session control message or the general message transmitted by the terminal A1 100A of the user A, it transmits a response message including information regarding the control message or the general message to the CPM PF server.

In FIG. 8, some elements (e.g., SIP/IP network, etc.) are omitted in the illustration for the sake of brevity. The operation of the omitted elements can be easily understood by the skilled person in the art with reference to FIGS. 4 to 7.

FIG. 8 will now be described in detail.

1) First, in order to generate a CPM session, the terminal A1 100A of the user A transmits a session invitation message, e.g., an SIP-based INVITE message.

2) Then, the CPM PF server 810A checks a storage-related element, e.g., a CPM conversation history-related element, with reference to the user preference (e.g., the user preference) with respect to the user A.

3) to 4) The CPM PF server 810A transmits the session invitation message to the terminal B1 100B of the user B, and the terminal B1 100B transmits a response message, e.g., an SIP-based 200 OK message.

5) When the session invitation message needs to be stored according to the checking of the user preference, the CPM PF server 810A requests the message storage server 600 to store the session invitation message.

6) The message storage server 600 transmits a response message with respect to the session invitation message to the CPM PF server 810A. In this case, the message storage server 600 includes the information (e.g., identification information or UID) regarding the session invitation message stored in the response message.

7) The CPM PF server 810A transmits the response message including the information to the terminal A1 100A.

8) to 9) The terminal A1 100A transmits the message to the CPM PF server 810A by using the established session. Then, the CPM PF server 810A requests the message storage server 600 to store the message.

10) The message storage server 600 stores the message and transmits the response message to the CPM PF server 810A. In this case, the response message includes the information (e.g., identification information or UID) regarding the stored message.

11) to 13) When the CPM PF server 810A receives the response message, it transmits the response message to the terminal B1 100B. When a response message with respect to the message is received from the terminal B1 100B, the CPM PF server 10A includes the information which has been received from the message storage server 600 in the response message and transmits the same to the terminal A 100A.

14) to 18) The terminal A1 100A transmits a session termination message, e.g., an SIP-based BYE message, to the CPM PF server 810A in order to terminate the session. Then, the CPM PF server 810A requests the message storage server 600 to store the session termination message. The follow-up procedure can be easily understood by the skilled person in the art based on the above description and the related drawings, so a detailed description thereof will be omitted.

Figure 9:
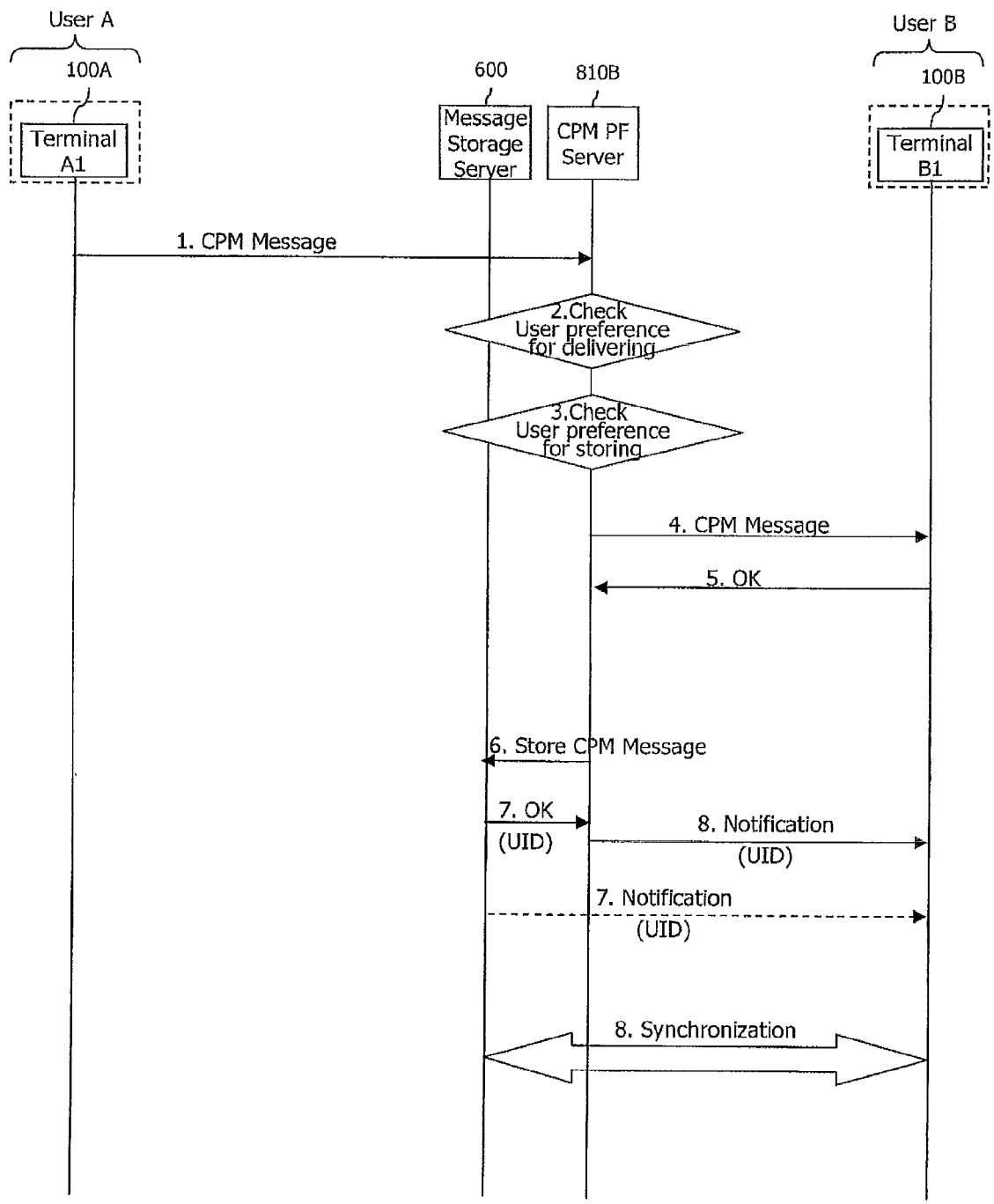
FIG. 9 is a flow chart illustrating a sixth exemplary embodiment of the present invention.

FIG. 9 is a flow chart illustrating a sixth exemplary embodiment of the present invention.

As shown in FIG. 9, the order of a procedure of storing a CPM message and a procedure of delivering the CPM message to the terminal B1 of the user B may be interchanged unlike the case as shown in FIGS. 4 to 8.

Namely, after transmitting the CPM message to the user terminal B1 100B, the CPM PF server 810B may request the message storage server 600 to store the CPM message.

When the CPM PF server 810B receives a response message including information (e.g., identification information or UID) with respect to the message is received from the storage server 600, the CPM PF server 810B transmits a notification message or an SIP-based NOTIFY message including the information to the terminal B1 100B.

Alternatively, the message storage server 600 may directly transmit the notification message including the information to the terminal B1 100B.

Meanwhile, FIG. 9 shows the case where the user preference (user preference) is checked before the message is transmitted to the terminal B1 100B. However, the user preference may be checked after the message is transmitted to the terminal B1 100B. Also, the user preference may be checked after a response message, e.g., an OK message, with respect to the transmitted message is received from the terminal B1 100B.

The sixth exemplary embodiment of the present invention as illustrated in FIG. 9 can be easily understood by the skilled person based on the description of the first to fifth exemplary embodiments of the present invention, so the content will be used without a detailed description.

Figure 10:
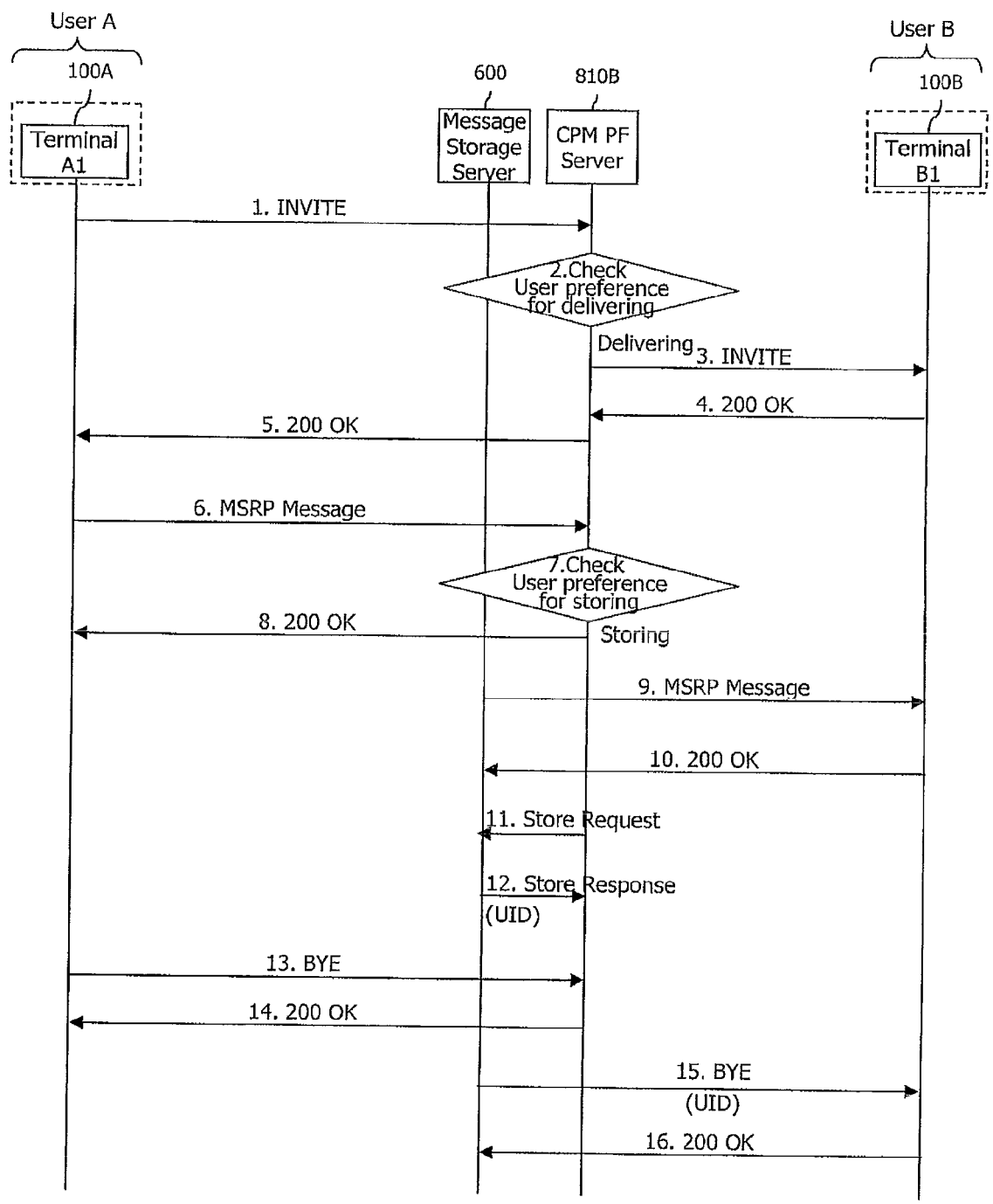
FIG. 10 is a flow chart illustrating the operation of a CPM PF server.

FIG. 10 is a flow chart illustrating a seventh exemplary embodiment of the present invention.

In the seventh exemplary embodiment of the present invention as illustrated in FIG. 10, a CPM large mode message is transmitted and received, and a message is stored after the CPM large mode message is transmitted to the terminal B 100B of the user B. Also, in the seventh exemplary embodiment of the present invention, information regarding the message is included in a session termination message indicating a termination of a session, and transmitted to the terminal B1 100B.

In FIG. 10, some elements (e.g., SIP/IP network, etc.) are omitted in the illustration for the sake of brevity. The operation of the omitted elements can be easily understood by the skilled person in the art with reference to FIGS. 4 to 9.

FIG. 10 will now be described in detail.

1) First, in order to generate a CPM session, the terminal A1 100A of the user A transmits a session invitation message, e.g., an SIP-based INVITE message. The session invitation message reaches the CPM PF server 810B within the home network of the user B through the CPM PF server 810A within the home network of the user A. In this case, when the user A wants to transmit a group message, the session invitation message goes through the CPM CF server. The session invitation message includes a feature tag indicating that the session invitation message is a CPM message. Meanwhile, in case where the terminal A1 100A is a non-CPM client not supporting the CPM (namely, when the terminal A1 100A supports only an SMS, an MMS, or an e-mail), the interworking server participates for the CPM PF server 810A. Namely, the interworking server converts the non-CPM message and delivers the converted message to the CPM PF server 810B.

2) When the session invitation message is received, the CPM PF server 810B checks whether or not the session invitation message is to be rejected. In detail, as described above, the CPM PF server 810B checks the feature tag of the session invitation message. And, as mentioned above, the CPM PF server 810B checks the <allow-reject-invite> element value of the user preference to check whether or not a message reception is allowed. The <allow-reject-invite> element value may vary (For example, a mail from aaa@spam.com is not allowed to be received). Subsequently, the CPM PF server 810B checks whether the session invitation message is an anonymous message. If anonymity is not supported, the CPM PF server 810B rejects the session invitation message.

When the CPM PF server 810B determines to receive the session invitation message, it checks a user preference (user preference) for a message delivery. In detail, the CPM PF server 810B checks a user preference (user preference) for message handling. The CPM PF server 810B determines whether to defer, interwork, store, or deliver the session invitation message according to the user preference (general user preference).

When the message is to be delivered or interworked, the CPM PF server 810B checks user preferences of one or more registered terminals of the user B to fine a reception-available terminal.

3) When the terminal B1 100B is determined to be a reception-available terminal, the CPM PF server 810B delivers the session invitation message to the terminal B1 100B.

4) In response to the received session invitation message, the terminal B1 100B transmits a response message, e.g., an SIP-based OK message.

5) The CPM PF server 810B transmits the response message to the terminal A1 100A of the user A. And then, the CPM PF server 810B prepares to receive an MSRP message from the terminal A 100A.

6) The terminal A 100A transmits the MSRP message.

7) When the MSRP message is received, the CPM PF server 810B checks a user preference for storage. Namely, the CPM PF server 810B checks an option related to the CPM conversion history from the user preference stored in an XDM of the user B. And the CPM PF server 810B checks whether the CPM conversion history has been set to be stored in the user preference. This process may be performed after the process of checking the user preference for the delivery or may be performed before the MSRP message is received.

Meanwhile, when the CPM PF server 810B determines to store the CPM conversation history, it does not transmit the MSRP message to the terminal B1 100B until when MSRP SEND chunks is completely received.

9) to 10) When receiving of the MSRP SEND chunks is completed, the CPM PF server 810B delivers the MSRP message to the terminal B1 100B. And then, the CPM PF server 810B receives a response message, e.g., an 200 OK message, from the terminal B1 100B.

11) When the CPM PF server 810B receives the response message, because the CPM conversation history has been determined to be stored according to the user preference, the CPM PF server 810B transmits a request of storing the MSRP message to the message storage server 600 *b* using an IMAP command.

12) The message storage server 600 stores the MSRP message, and as mentioned above, the message storage server 600 transmits a storage request response message including information (e.g., UID) regarding the message to the CPM PF server 810B.

13) The terminal A1 100A transmits a termination message, e.g., an SIP-based BYE message, for terminating the SIP-based session which was generated to transmit the CPM large mode message, to the CPM PF server 810B.

14) The CPM PF server 810B transmits a response message to the terminal A1 100A.

15) and 16) The CPM PF server 810B transmits the termination message, e.g., the SIP-based BYE message, including the information regarding the stored message which has been received from the message storage server 600 to the terminal B1 100B. Then, the terminal B1 100B transmits the response message to the CPM PF server 810B.

Meanwhile, when the message transmission fails for some reason, the CPM PF server 810B defers transmission of the MSRP message or interworks it based on the service provider's policy. And in case of deferring, CPM PF server 810B transmits a notification message indicating that message transmission is deferred to the terminal B1 100B.

Figure 11:
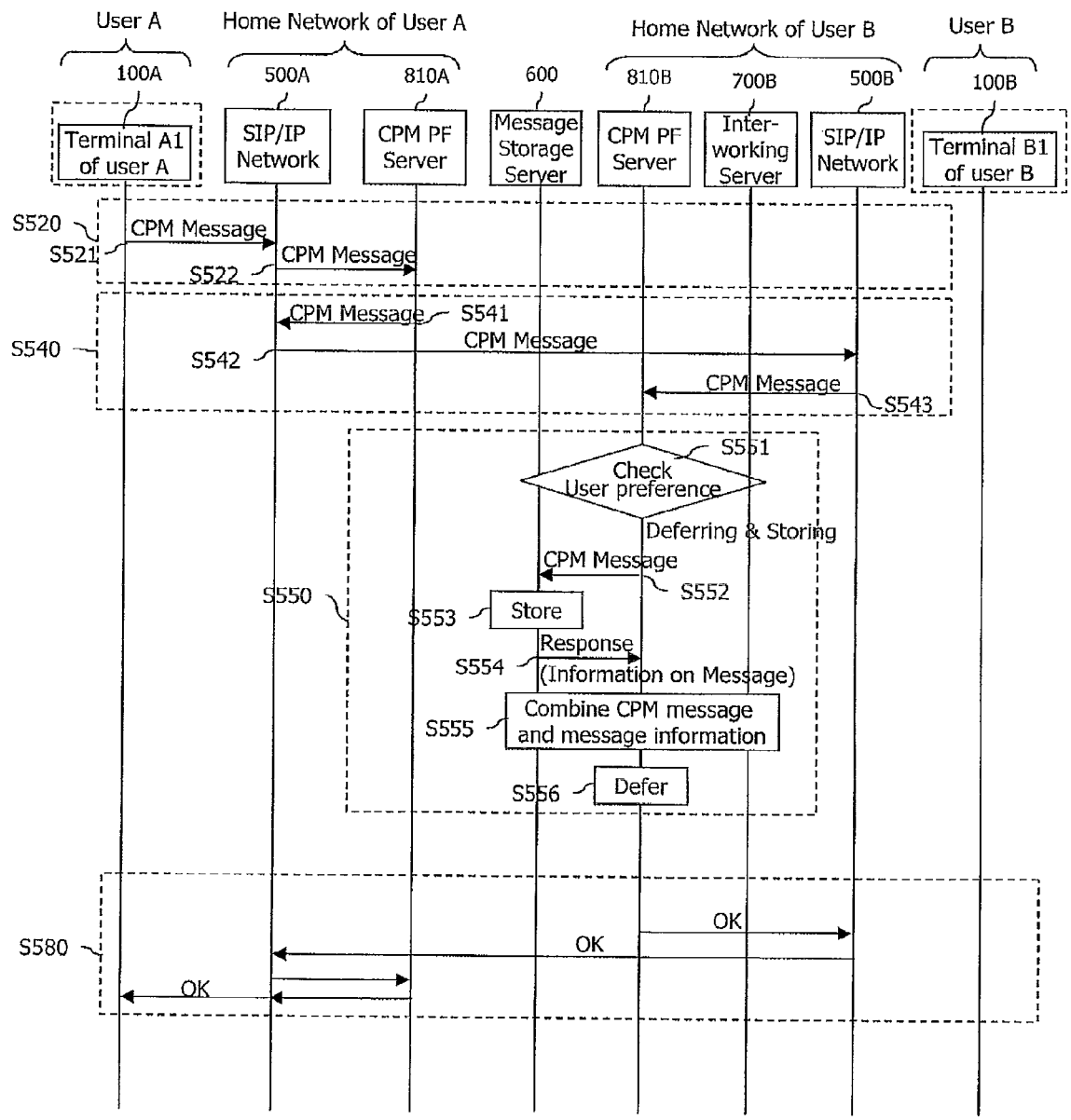
FIG. 11 is a schematic block diagram of the CPM PF server according to an exemplary embodiment of the present invention.

FIG. 11 is a flow chart illustrating an eighth exemplary embodiment of the present invention.

In the eighth exemplary embodiment of the present invention as illustrated in FIG. 11, a CPM page mode is illustrated. Also, FIG. 11 shows the case where a repeated reception and storage are prevented when the terminal B1 receives the deferred CPM message, after the CPM message to the terminal B1 100B of the user B is deferred.

FIG. 11 illustrates a procedure S520 of transmitting the CPM message by the terminal A1 100A of the user A, a procedure S540 of delivering the CPM message to the CPM PF server within the home network of the user B, a procedure S550 of checking the user preference (user preference) and storing the CPM message, and a procedure S580 of transmitting a response message with respect to the CPM message.

1) First, the procedure S520 of transmitting the CPM message by the terminal A1 100A of the user A is performed. The procedure S520 is similar to the procedure S120 in FIG. 4, so the description of the procedure S120 in FIG. 4 will be used.

2) Next, the procedure S540 of delivering the CPM message to the CPM PF server within the home network of the user B is performed. The procedure S540 is similar to the procedure S140 in FIG. 4, so content of the procedure S140 in FIG. 4 will be used.

3) And then, the procedure S550 of checking the user preference and storing the CPM message is performed.

When the CPM PF server 810B within the home network of the user B receives the CPM message, it checks the user preference (or user settings) of the user B (S551).

The procedure S551 of checking the user preference (or user settings) can be easily understood by the skilled person based on the description with reference to FIG. 4, so its detailed description will be omitted.

Meanwhile, if it is checked that there is no terminal that can receive the message, the CPM PF server 810B checks the general user preference to determine whether to defer, interwork, redirect or store the message.

When the message is determined to be deferred or stored, the CPM PF server 810B transmits the CPM message to the message storage server 600 (S552). At this time, the CPM PF server 810B delivers the CPM message to the message storage server 600 by using the IMAP command.

The message storage server 600 stores the CPM message (S553) and transmits a response message including information (e.g., an identification or a UID) allowing for discrimination of the message from the plurality of messages stored in the storage server 600) regarding the CPM message stored in the message storage server 600 to the CPM PF server 810B (S554). The identification or the UID may be generated according to RFC3501.

The CPM PF server 810B combines the information within the received response message, the CPM message, and the information (S555). Namely, the CPM PF server 810B includes the information in the CPM message.

Subsequently, the CPM PF server 810B temporarily stores the combined message and defers its transmission (S556).

5) Next, the procedure S580 of transmitting a response message with respect to the CPM message is performed. The CPM PF server 810B transmits the response message, e.g., an SIP-based 200 OK message, with respect to the CPM message to the CPM PF server 810A via the SIP/IP networks 500A and 500B.

When the CPM PF server 810A receives the response message, it delivers the response message to the terminal A1 100A of the user A.

6) Meanwhile, the CPM PF server 810B processes the deferred CPM message according to a related setting. For example, when the user B requests the deferred CPM message, the CPM PF server 810B delivers the CPM message including the information regarding the message to the terminal of the user B. Accordingly, the terminal of the user B may not repeatedly receive the message by using the information regarding the message in performing synchronization.

Figure 12:
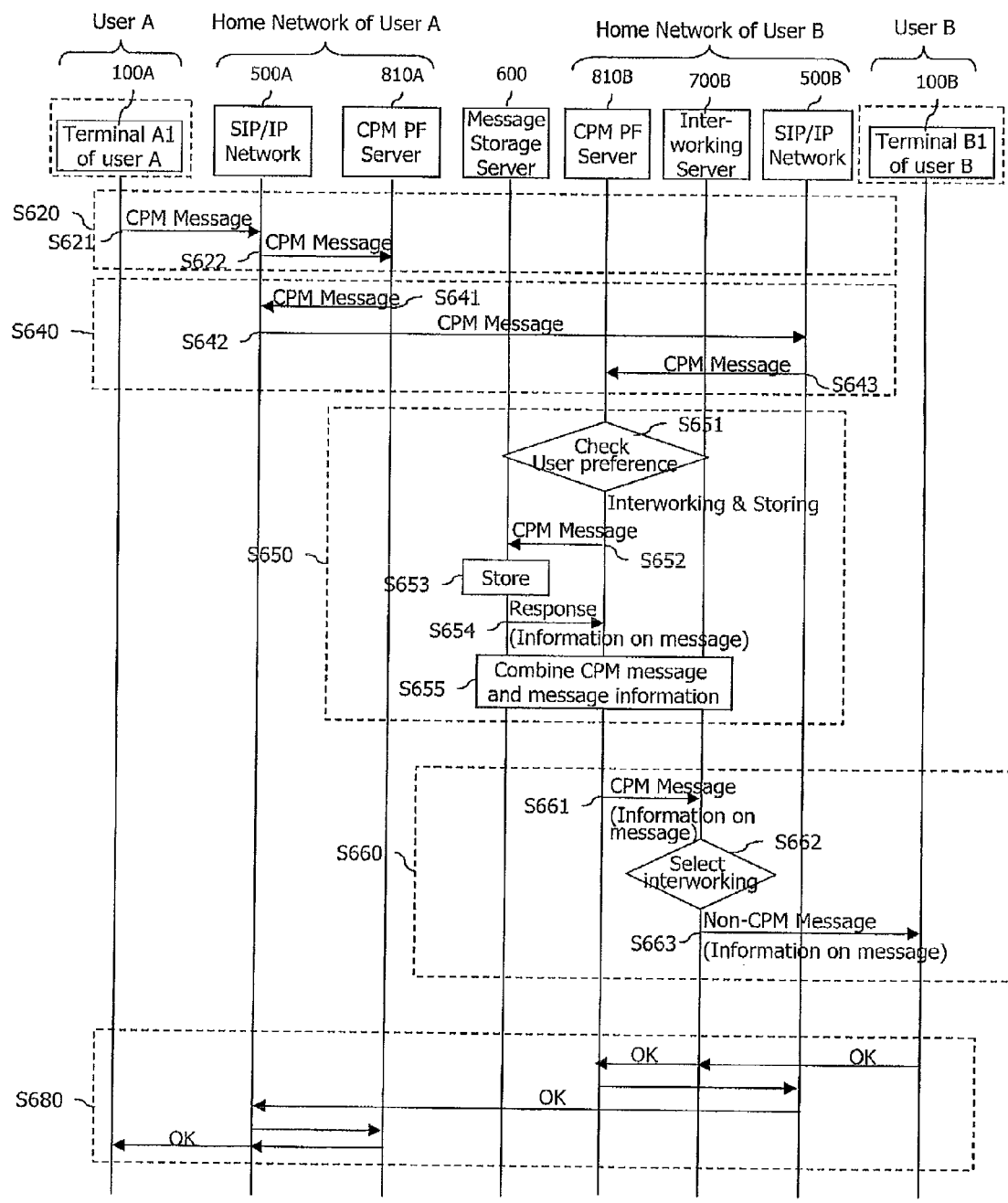
FIG. 12 is a flow chart illustrating the process of a ninth exemplary embodiment of the present invention.

FIG. 12 is a flow chart illustrating the process of a ninth exemplary embodiment of the present invention.

In the ninth exemplary embodiment of the present invention as illustrated in FIG. 12, a CPM page mode is illustrated. Also, FIG. 12 shows the case where a repeated reception and storage are prevented when the CPM message is interworked and transmitted to the terminal B1 of the user B.

FIG. 12 illustrates a procedure S620 of transmitting the CPM message by the terminal A1 100A of the user A, a procedure S640 of delivering the CPM message to the CPM PF server within the home network of the user B, a procedure S650 of checking the user preference ( ) and storing the CPM message, an interworking procedure S660, and a procedure S680 of transmitting a response message.

1) First, the procedure S620 of transmitting the CPM message by the terminal A1 100A of the user A is performed. The procedure S620 is similar to the procedure S120 in FIG. 4, so the description of the procedure S120 in FIG. 4 will be used.

2) Next, the procedure S640 of delivering the CPM message to the CPM PF server within the home network of the user B is performed. The procedure S640 is similar to the procedure S140 in FIG. 4, so content of the procedure S140 in FIG. 4 will be used.

3) And then, the procedure S650 of checking the user preference and storing the CPM message is performed.

When the CPM PF server 810B within the home network of the user B receives the CPM message, it checks the user preference (or user settings) of the user B (S651).

The procedure S651 of checking the user preference (or user settings) can be easily understood by the skilled person based on the description with reference to FIG. 4, so its detailed description will be omitted.

Meanwhile, if it is checked that there is no terminal that can receive the message, the CPM PF server 810B checks the general user preference to determine whether to defer, interwork, redirect or store the message.

In this case, if the message is determined to be interworked, the CPM PF server 810B checks the user preference (user preference) again to determine whether to store the message. Namely, when the message interworking is determined, it means that there is a terminal that can receive the message, so the CPM PF server 810B checks the related user preference again.

The message is determined to be interworked, for example, when there is not registered terminal of the user B, when there is no CPM user having a valid SIP address (Non-CPM user with a valid SIP address), when there is no CPM function within a controlling or terminating network (missing CPM support in the controlling or terminating network), when an SIP/IP core is not supported within the controlling or terminating network (missing SIP/IP core support in the controlling or terminating network), when routing to a recipient via an SIP/IP core network is not possible (recipient not routable via SIP/IP core network), or when media of the CPM message is not supported by the interworking server (handling of media not supported by interworking function).

In this manner, when the message is determined to be stored and interworked, the CPM PF server 810B transmits the CPM message to the message storage server 600 (S652).

In this case, the CPM PF server 810B delivers the CPM message to the message storage server 600 by using the IMAP command.

The message storage server 600 stores the CPM message (S653) and transmits a response message including information (e.g., an identification or a UID) allowing for discrimination of the message from the plurality of messages stored in the storage server 600) regarding the CPM message stored in the message storage server 600 to the CPM PF server 810B (S654). The identification or the UID may be generated according to RFC3501.

The CPM PF server 810B combines the information within the received response message, the CPM message, and the information (S655). Namely, the CPM PF server 810B includes the information in the CPM message.

4) Next, the interworking procedure S660 is performed.

In detail, the CPM PF server 810B transmits the combined CPM message to the interworking server 700B (S661).

The interworking server 700B selects an appropriate interworking function (S662). The selecting of the interworking function may be performed based on the following reference. For example, the reference includes a non-CPM communication service identifier that accompanies a non-CPM user address, a service provider policy, a target user preference (target user preference), target user's presence information, message characteristics (e.g., message size and contents), session characteristics (e.g., media used for a session), and the like.

The interworking server 700B interworks the CPM message to the non-CPM message. Namely, the interworking server 700B maps the information within the CPM message to an appropriate header of the non-CPM message. If there is no appropriate header, the interworking server 700B generates an extended header.

The interworking server 700B transmits the non-CPM message to the terminal B1 200B (S663).

Then, the terminal B1 200B stores the information regarding the message included in the non-CPM message. In this case, if the repository for the CPM message and that for the non-CPM message are the same within the terminal B1 200B, a repeated reception can be prevented by using the information regarding the message in performing synchronization later.

5) And then, the response message transmission procedure S680 is performed. The CPM PF server 810B transmits a response message, e.g., an SIP-based 200 OK message, with respect to the CPM message to the CPM PF server 810A via the SIP/IP networks 500A and 500B. When the CPM PF server 810A receives the response message, it delivers the response message to the terminal A1 100A of the user A.

Figure 13:
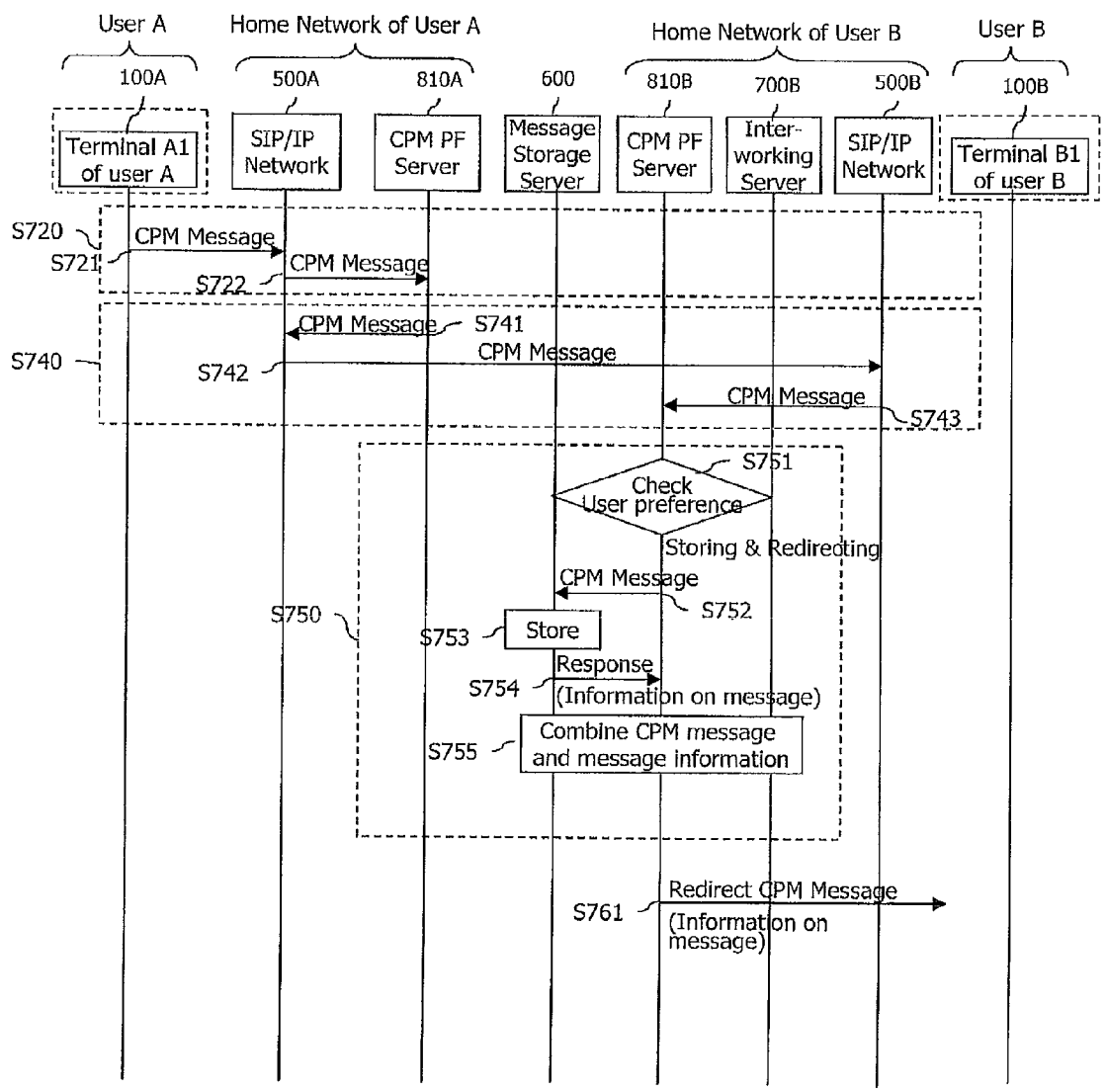
FIG. 13 is a flow chart illustrating the process of a tenth exemplary embodiment of the present invention.

FIG. 13 is a flow chart illustrating the process of a tenth exemplary embodiment of the present invention.

In the tenth exemplary embodiment of the present invention as illustrated in FIG. 13, a CPM page mode is illustrated. Also, FIG. 13 shows the case where a repeated reception and storage are prevented when the CPM message is interworked and transmitted to the terminal B1 of the user B.

FIG. 13 illustrates a procedure S720 of transmitting the CPM message by the terminal A1 100A of the user A, a procedure S740 of delivering the CPM message to the CPM PF server within the home network of the user B, a procedure S750 of checking the user preference (user preference) and storing the CPM message, and a redirecting procedure S761.

1) First, the procedure S720 of transmitting the CPM message by the terminal A1 100A of the user A is performed. The procedure S720 is similar to the procedure S120 in FIG. 4, so the description of the procedure S120 in FIG. 4 will be used.

2) Next, the procedure S740 of delivering the CPM message to the CPM PF server within the home network of the user B is performed. The procedure S740 is similar to the procedure S140 in FIG. 4, so content of the procedure S140 in FIG. 4 will be used.

3) And then, the procedure S750 of checking the user preference and storing the CPM message is performed.

When the CPM PF server 810B within the home network of the user B receives the CPM message, it checks the user preference (or user settings) of the user B (S751).

The procedure S751 of checking the user preference (or user settings) can be easily understood by the skilled person based on the description with reference to FIG. 4, so its detailed description will be omitted.

Meanwhile, if it is checked that there is no terminal that can receive the message, the CPM PF server 810B checks the general user preference to determine whether to defer, interwork, redirect or store the message.

In this case, when the message is determined to be redirected, the CPM PF server 810B checks the user preference (user preference) to determine whether to store the message. Namely, when the message is determined to be redirected, it means that there is a terminal that can receive the message, so the CPM PF server 810B checks the related user preference again.

Thus, when the message is determined to be stored and redirected, the CPM PF server 810B transmits the CPM message to the message storage server 600 (S752).

In this case, the CPM PF server 810B delivers the CPM message to the message storage server 600 by using the IMAP command.

The message storage server 600 stores the CPM message (S753) and transmits a response message including information (e.g., an identification or a UID) allowing for discrimination of the message from the plurality of messages stored in the storage server 600) regarding the CPM message stored in the message storage server 600 to the CPM PF server 810B (S754). The identification or the UID may be generated according to RFC3501.

The CPM PF server 810B combines the information within the received response message, the CPM message, and the information (S755). Namely, the CPM PF server 810B includes the information in the CPM message.

4) Next, the CPM PF server 810B redirects the combined CPM message to a different terminal of the user B (S761). In this case, the different terminal prevents a repeated storing in performing synchronization by using the information regarding the message.

Figure 14:
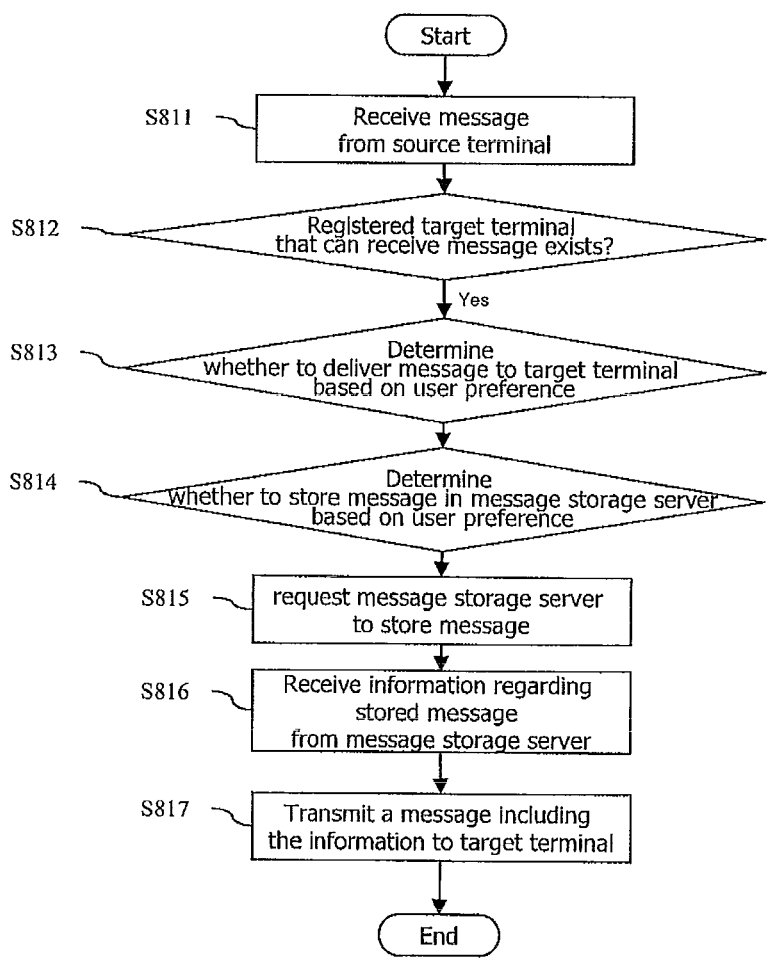
FIG. 14 is a flow chart illustrating the process of the CPM PF server.

FIG. 14 is a flow chart illustrating the process of the CPM PF server.

As shown in FIG. 14, when the CPM PF server 810 receives a message from a source terminal (S811), the CPM PF server 810 checks whether there are registered target terminals that can receive a message from the source terminal based on a user preference (user preference) (S812).

When it is checked that there is a registered terminal (or terminals), the CPM PF server 810 determines whether to deliver the message from the source terminal to the checked target terminal based on the user preference (S813).

When the CPM PF server 810 determines to deliver the message, the CPM PF server 810 determines whether to store the message in the message storage server based on the user preference (user preference) (S814).

When the CPM PF server 810 determines to store the message, the CPM PF server 810 request the message storage server 600 to store the message (S815) and receives a response message including information regarding the storage message from the message storage server (S816).

Then, the CPM PF server 810 includes the information in the message and transmits the same to the target terminal (S817).

The method described so far may be implemented by software, hardware or their combination. For example, the method according to the present invention may be stored in a storage medium (e.g., an internal memory, a flash memory, a hard disk, or the like), and may be implemented by codes or command languages in a software program that can be executed by a processor such as a microprocessor, a controller, a microcontroller, an ASIC (Application Specific Integrated Circuit), and the like. This will now be described with reference to FIG. 15.

Figure 15:
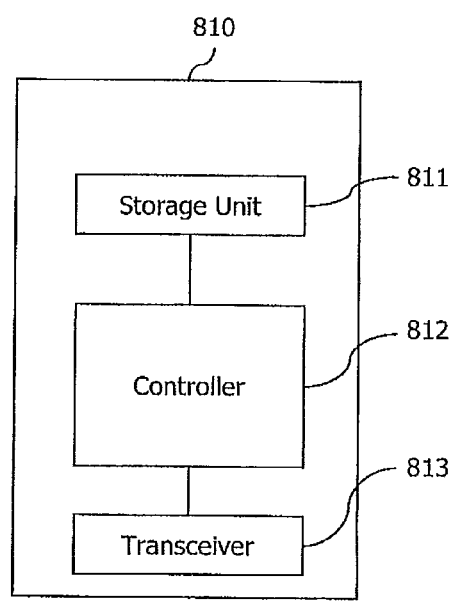
FIG. 15 is a schematic block diagram of the CPM PF server according to an exemplary embodiment of the present invention.

FIG. 15 is a schematic block diagram of the CPM PF server according to an exemplary embodiment of the present invention.

As shown in FIG. 15, the CPM PF server 810 includes a storage unit 811, a controller 812, a transmission/reception unit 813.

The storage unit 811 stores a software program implementing the methods illustrated in FIGS. 4 to 14.

The controller 812 controls the storage unit 811 and the transmission/reception unit 813. In detail, the controller 812 executes the respective methods stored in the storage unit. Also, the controller 813 transmits the foregoing signals via the transmission/reception unit.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for delivering a message, the method performed by a converged IP messaging (CPM) server and comprising:

determining, by the CPM server, whether to defer a message from a source terminal to a recipient based on a user preference;

determining, by the CPM server, whether to store the message in a message storage server based on the user preference if the message is determined not to be deferred, but to be delivered;

requesting, by the CPM server, the message storage server to store the message if the message is determined to be stored;

receiving, by the CPM server, a response from the message storage server after the message is stored in the message storage server, wherein the response includes information regarding the stored message, wherein the information includes a unique identifier (UID) regarding the message;

checking, by the CPM server, whether there is a registered target terminal of the recipient that is able to receive the message from the source terminal based on a user preference;

extracting, by the CPM server, the information from the response; and transmitting, by the CPM server, the message received from the source terminal, into which the information is added, to the registered target terminal, wherein the message having the same UID in the message storage server is not transmitted repeatedly to the registered target terminal when synchronizing messages in the registered target terminal with the message storage server.

2. The method of claim 1, further comprising:
determining whether to interwork the message, or whether to redirect the message to a different terminal according to the user preference.

3. The method of claim 1, further comprising:
determining whether to reject the message based on the information in the message from the source terminal.

4. The method of claim 1, wherein the information allows for discrimination of the message in the message storage server.

5. The method of claim 1, wherein the CPM server is located within a home network of the target terminal.

6. The method of claim 1, further comprising:
checking, by the CPM server, whether or not the message from the source terminal is in a large-sized CPM message mode.

7. The method of claim 1, further comprising:
receiving a response from the target terminal; and
transmitting the response from the target terminal to the CPM server located in the home network of the source terminal.

8. The method of claim 7, wherein when there are a plurality of target terminals and a first response among responses from the plurality of target terminals, is received, the first response is transmitted to the CPM server located in the home network of the source terminal.

9. A method for delivering a message, the method performed by a converged IP messaging (CPM) server and comprising:
determining, by the CPM server, whether to deliver a message from a source terminal to a recipient in an interworking manner or to redirect the message to a different terminal of the recipient based on a user preference;
determining, by the CPM server, whether to store the message in a message storage server based on the user preference if the message is determined not to be deferred, but to be interworked or redirected;
requesting, by the CPM server, the message storage server to store the message if the message is determined to be stored;
receiving, by the CPM server, a response from the message storage server after the message is stored in the message storage server, wherein the response includes information regarding the stored message, wherein the information includes a unique identifier (UID) regarding the message;

checking, by the CPM server, whether there is a registered target terminal of the recipient that is able to receive the message from the source terminal based on the user preference;

extracting, by the CPM server, the information from the response; and transmitting the message received from the source terminal, in which the information is added, to the registered target terminal in an interworking manner or redirecting the same to the different terminal, wherein the message having the same UID in the message storage server is not transmitted repeatedly to the registered target terminal when synchronizing messages in the registered target terminal with the message storage server.

10. The method of claim 9, wherein the information allows for discrimination of the message in the message storage server.

11. The method of claim 9, wherein the CPM server is located within a home network of the target terminal.

12. A converged IP messaging (CPM) server, comprising:
a processor configured to determine whether to deliver a message from a source terminal to a recipient based on the user preference, and determine whether to store the message in a message storage server if the message is determined not to be deferred, but to be delivered; and
a transceiver configured to request the message storage server to store the message if the message is determined to be stored, and receive a response regarding the stored message after the message is stored in the message storage server, the response including information regarding the stored message, wherein the information includes a unique identifier (UID) regarding the message, wherein the processor is further configured to check whether there is a registered target terminal of the recipient that is able to receive the message from the source terminal based on the user preference, wherein the processor is further configured to extract the information from the response, wherein the transceiver is further configured to transmit the message received from the source terminal, in which the information is added, to the registered target terminal, and wherein the message having the same UID in the message storage server is not transmitted repeatedly to the registered target terminal when synchronizing messages in the registered target terminal with the message storage server.

13. The server of claim 12, wherein the information allows for discrimination of the message in the message storage server.

* * * * *